United States Patent
Komatsuzaki et al.

(10) Patent No.: US 9,483,998 B2
(45) Date of Patent: *Nov. 1, 2016

(54) CONTENT PROVIDING SYSTEM, RECEIVING APPARATUS AND METHOD, STORAGE MEDIUM, AND PROGRAM

(71) Applicant: SONY CORPORATION, Tokyo (JP)

(72) Inventors: Yoriko Komatsuzaki, Tokyo (JP); Makoto Sato, Tokyo (JP); Takuro Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/990,010

(22) Filed: Jan. 7, 2016

(65) Prior Publication Data

US 2016/0118018 A1    Apr. 28, 2016

Related U.S. Application Data

(63) Continuation of application No. 13/487,386, filed on Jun. 4, 2012, now Pat. No. 9,277,272, which is a continuation of application No. 12/482,349, filed on Jun. 10, 2009, now Pat. No. 8,195,740, which is a continuation of application No. 10/494,650, filed as application No. PCT/JP03/09516 on Jul. 28, 2003, now Pat. No. 7,577,715.

(30) Foreign Application Priority Data

Sep. 10, 2002 (JP) ................................. 2002-263629

(51) Int. Cl.
 *G06F 15/16* (2006.01)
 *G09G 5/00* (2006.01)
 (Continued)

(52) U.S. Cl.
 CPC .......... *G09G 5/006* (2013.01); *H04N 7/17318* (2013.01); *H04N 21/2541* (2013.01);
 (Continued)

(58) Field of Classification Search
 CPC ...................... H04N 21/2541; H04N 21/4627

USPC .......... 709/202–205, 217–219, 249; 725/22, 725/105, 116–118, 121–123
See application file for complete search history.

(56) References Cited

U.S. PATENT DOCUMENTS 6,144,401 A    11/2000  Casement et al.
6,598,075 B1    7/2003  Ogdon et al.
(Continued)

FOREIGN PATENT DOCUMENTS

EP    1178697 A2    2/2002
EP    1 311 126      5/2003
(Continued)

OTHER PUBLICATIONS

European Patent Application No. 11184874.3: Extended European Search Report, dated Feb. 22, 2013.
(Continued)

*Primary Examiner* — Bharat N Barot
(74) *Attorney, Agent, or Firm* — Paratus Law Group, PLLC

(57) ABSTRACT

The present invention relates to a content providing system, a receiving apparatus and method, a storage medium, and a program, which enable to perform a variety of contents provisions. An operational terminal 21 can obtain, from a storage terminal 1, contents corresponding to utilization information sent from an operational terminal 11 that is receiving provision of predetermined contents from a storage terminal 1. That is, if a user 23 is interested in contents that a user 13 is watching and listening to on the operational terminal 11, and desires to watch and listen to it, the user 23 can watch and listen to on the operational terminal 21, the contents that the user 13 is watching and listening to, by holding the operational terminal 21 very close to the operational terminal 11, or holding the operational terminal 11 very close to the operational terminal 21.

15 Claims, 14 Drawing Sheets

(51) Int. Cl.

| | |
|---|---|
| *H04N 7/173* | (2011.01) |
| *H04N 21/254* | (2011.01) |
| *H04N 21/433* | (2011.01) |
| *H04N 21/4363* | (2011.01) |
| *H04N 21/4402* | (2011.01) |
| *H04N 21/4627* | (2011.01) |
| *H04N 21/472* | (2011.01) |
| *H04N 21/4788* | (2011.01) |
| *H04N 21/63* | (2011.01) |
| *H04N 21/658* | (2011.01) |
| *H04N 21/8352* | (2011.01) |

(52) U.S. Cl.
CPC .... *H04N21/4331* (2013.01); *H04N 21/43637* (2013.01); *H04N 21/440281* (2013.01); *H04N 21/4627* (2013.01); *H04N 21/4788* (2013.01); *H04N 21/47202* (2013.01); *H04N 21/47214* (2013.01); *H04N 21/632* (2013.01); *H04N 21/6581* (2013.01); *H04N 21/8352* (2013.01); *G09G 2358/00* (2013.01); *G09G 2370/02* (2013.01)

(56) References Cited

U.S. PATENT DOCUMENTS

| | | |
|---|---|---|
| 6,850,252 B1 | 2/2005 | Hoffberg |
| 7,277,946 B2 | 10/2007 | Humphrey et al. |
| 7,577,715 B2 | 8/2009 | Komatsuzaki et al. |
| 8,195,740 B2 | 6/2012 | Komatsuzaki et al. |
| 2002/0023083 A1 | 2/2002 | Durkalski |
| 2002/0042754 A1 | 4/2002 | Del Beccaro et al. |
| 2002/0077984 A1 | 6/2002 | Ireton |
| 2003/0018772 A1 | 1/2003 | Meandzija et al. |
| 2003/0110503 A1 | 6/2003 | Perkes |
| 2009/0210898 A1* | 8/2009 | Childress ........... H04N 21/4667 725/105 |
| 2012/0239780 A1* | 9/2012 | Komatsuzaki ..... H04N 21/2541 709/217 |

FOREIGN PATENT DOCUMENTS

| | | |
|---|---|---|
| JP | 2000-123048 | 4/2000 |
| JP | 2000-511378 | 8/2000 |
| JP | 2002-073651 | 3/2002 |
| JP | 2003-018576 | 1/2003 |
| JP | 2003-153212 | 5/2003 |
| KR | 2002-0042817 | 6/2002 |
| KR | 2002-0042848 | 6/2002 |
| WO | WO00/14963 A1 | 3/2000 |
| WO | WO 00/43892 A1 | 7/2000 |
| WO | WO 01/50309 A2 | 7/2001 |

OTHER PUBLICATIONS

European Patent Application No. 03795204.1: Result of Consultation, dated Nov. 9, 2012.

European Patent Application No. 11184874.3: Partial European Search Report, dated Oct. 30, 2012.

Nosovic, M., et al., "Scheduled Rendezvous and RFID Wakeup in Embedded Wireless Networks" Proceedings of IEEE International Conference on Communications, Apr. 28-May 2, 2002, New York, NY, USA. IEEE, 5:3325-3329 (Apr. 28, 2002).

Woodings, et al., "Rapid Heterogeneous Connection Establishment: Accelerating Bluetooth Inquiry Using IrDA" IEEE Wireless Communications and Networking Conference, Jan. 26, 2001, p. 1-14.

Supplementary European Search Report for Application No. EP 03795204, dated Aug. 4, 2009.

Jul. 6, 2016, European Communication for related EP Application No. 11184874.3.

\* cited by examiner

F I G. 2

| NETWORK NAME | TEST GROUP |
|---|---|
| SSID | 0x123456 |
| WEP KEY | 0x1234567890 |
| COMMUNICATION NETWORK MODE | AdHoc |

F I G. 3

| RELATED URI | http://xxx.xxx |
|---|---|
| HOLD PERMISSION | PERMISSION |
| PROVISION PERMISSION | PERMISSION |
| COMMUNICATION VALID PERIOD | 2002/05/06 |
| INFORMATION VALID PERIOD | 2002/04/05 |
| INFORMATION UPDATE CONDITION | SAME EXCEPT FOR Wep |

CONTENT PROVIDING SYSTEM, RECEIVING APPARATUS AND METHOD, STORAGE MEDIUM, AND PROGRAM

CROSS REFERENCE TO PRIOR APPLICATION

This application is a continuation of U.S. patent application Ser. No. 13/487,386 (filed on Jun. 4, 2012), which is a continuation of Ser. No. 12/482,349 (filed on Jun. 10, 2009 and issued as U.S. Pat. No. 8,195,740 on Jun. 5, 2012), which is a continuation of Ser. No. 10/494,650 (filed on Nov. 22, 2004 and issued as U.S. Pat. No. 7,577,715 on Aug. 18, 2009), which is a National Stage Patent Application of PCT International Patent Application No. PCT/JP03/09516 (filed on Jul. 28, 2003) under 35 U. S. C. §371, which claims priority to Japanese Patent Application No. 2002-263629 (filed on Sep. 10, 2002), which are all hereby incorporated by reference in their entirety.

TECHNICAL FIELD

The present invention relates to a content providing system, an apparatus and a method for information processing, a storage medium, and a program. In particular, the invention relates to a content providing system, an apparatus and a method for information processing, a storage medium, and a program, which enable provision of contents in a variety of simple methods.

BACKGROUND ART

There have been proposed various types of methods in which an apparatus for providing contents (hereinafter referred to as a content providing apparatus) via an established communication path to an apparatus for utilizing contents (hereinafter referred to as a content utilizing apparatus), or in which a content utilizing apparatus receives the provision of contents from a content providing apparatus.

However, there exists neither a method in which a first content utilizing apparatus obtains from a content providing apparatus contents corresponding to utilization information of contents sent from a second content utilizing apparatus that is receiving provision of predetermined contents from the content providing apparatus, nor a method in which a first content providing apparatus obtains from a second content providing apparatus contents corresponding to provision information of contents sent from the second content providing apparatus that is providing predetermined contents to a content utilizing apparatus, and stores and provides them to the content utilizing apparatus.

While on the side of receiving provision of contents, when receiving contents and displaying the received contents, or registering (storing) the displayed contents, it is usually configured so as to inquire a user about permission thereof. That is, the user is required to answer (for example, to input permission to a displayed dialog) every time such an inquiry is made, and therefore an operation thereof is tedious.

DISCLOSURE OF THE INVENTION

The present invention has been made with this circumstance in view, and is aimed at enabling to provide contents in a variety of simple methods.

A first content providing system of the present invention is characterized in the followings. A content providing apparatus includes providing means for providing, in response to a request, contents to a first content utilizing apparatus or a second content utilizing apparatus. The first content utilizing apparatus includes: first requesting means for requesting the content providing apparatus to provide contents; first obtaining means for obtaining, in response to a request by the first requesting means, contents provided by the providing means of the content providing apparatus; first utilizing means for utilizing contents obtained by the first obtaining means; and sending means for sending, in response to a request, utilization information of contents obtained by the first obtaining means to a second content utilizing apparatus. The second content utilizing apparatus includes: second requesting means for requesting the first content utilizing apparatus to provide contents; receiving means for receiving, in response to a request by the second requesting means, utilization information sent by the sending means of the first content utilizing apparatus; third requesting means for requesting the content providing apparatus to provide contents corresponding to utilization information received by the receiving means; second obtaining means for obtaining, in response to a request by the third requesting means, contents provided by the providing means of the content providing apparatus; and a second utilizing means for utilizing contents obtained by the second obtaining means.

The sending means of the first content utilizing apparatus can send the second content utilizing apparatus contents that are currently obtained by the first obtaining means, or utilization information of contents that are currently utilized by the first utilizing means.

It is possible to have utilization information contain an ID of contents obtained by the first obtaining means of the first content utilizing apparatus.

It is possible to have utilization information contain an ID of contents obtained by the first obtaining means of the first content utilizing apparatus, and control information for controlling utilization of contents, or apparatus information indicating an apparatus that controls utilization of contents.

The control information is to be utilization indication information indicating predetermined utilization, or utilization permission information indicating permission or non-permission of predetermined utilization. It is possible to have the second utilizing means of the second content utilizing apparatus utilize contents obtained by the second obtaining means, on the basis of utilization indication information or utilization permission information.

The utilization indication information can be taken as information indicating utilization of any one of reproduce, stop, temporary stop, fast-forward, or rewind, store, or printing of contents. The utilization permission information can be taken as information indicating permission or non-permission of utilization of any one of reproduce, stop, temporary stop, fast-forward, or rewind, store, or printing.

Utilization indication information can be taken as information indicating utilization corresponding to utilization by the first utilizing means of the first content utilizing apparatus.

Apparatus information is to be information indicating on apparatus of the content providing apparatus, the first content utilizing apparatus and the second content utilizing apparatus. It is possible to have the second utilizing means of the second content utilizing apparatus utilize contents obtained by the second obtaining means, in accordance with control of an apparatus indicated by apparatus information.

To the first content utilizing apparatus, it is possible to add designating means for designating contents obtained by the first obtaining means. It is possible to have the sending means send, in response to a request, utilization information of contents designated by the designating means, to the second content utilizing apparatus.

To the second content utilizing apparatus, it is possible to add designating means for designating provision of contents that are currently obtained by the first obtaining means of the first content utilizing apparatus, or provision of contents that are currently utilized by the first utilizing means. It is possible to have the second requesting means request provision designated by the designating means, from the first content utilizing apparatus. It is possible to have the sending means of the first content utilizing apparatus send, in response to a request by the second requesting means of the second content utilizing apparatus, contents that are currently obtained by the first obtaining means, or utilization information of contents that are currently utilized by the first utilizing means, to the second content utilizing apparatus.

It is possible to add executing means for executing a predetermined process, to the second content utilizing apparatus. It is possible to have the second utilizing means stop the process if the process by the executing means is being executed when utilizing contents, and resume the process when the utilization of the contents is terminated.

In the first content providing system of the present invention, by the content providing apparatus, contents are provided, in response to a request, to the first content utilizing apparatus or the second content utilizing apparatus. By the first content utilizing apparatus, provision of contents is requested to the content providing apparatus and provided contents are obtained in response to a request, and the obtained contents are utilized, and utilization information of the obtained contents are sent to the second content utilizing apparatus in response to a request. By the second content utilizing apparatus, provision of contents is requested to the first content utilizing apparatus, and utilization information sent in response to a request is received, and provision of contents corresponding to the received utilization information is requested, and the provided contents are obtained in response to a request, and the obtained content is utilized.

A second content providing system of the present invention is characterized in the followings. A first content providing apparatus includes: first providing means for providing, in response to a request, contents, to a second content providing apparatus or a content utilizing apparatus; and sending means for sending, in response to a request, provision information about provision of contents by the first providing means to the second content providing apparatus. The second content providing apparatus includes: first content requesting means for requesting the content providing apparatus to provide contents; receiving means for receiving provision information sent by the sending means of the first content providing apparatus, in response to a request by the first requesting means; second requesting means for requesting the first content providing apparatus to provide contents corresponding to provision information received by the receiving means; first obtaining means for obtaining contents provided by the first providing means of the first content providing apparatus, in response to a request by the second requesting means; storing means for storing contents obtained by the first obtaining means, and second providing means for providing, in response to a request, contents stored by the storing means to the content utilizing apparatus. The content utilizing apparatus includes: third requesting means for requesting the first content providing apparatus or the second contents requesting apparatus to provide contents; second obtaining means for obtaining, in response to a request by the third requesting means, contents provided by the first providing means of the first content providing apparatus or the second providing means of the second content providing apparatus; and utilizing means for utilizing contents obtained by the second obtaining means.

The sending means of the first content providing apparatus can send the second content providing apparatus contents that are currently provided to the content utilizing apparatus by the first providing means, or contents that are currently utilized by the first utilizing means of the content utilizing apparatus.

Provision information can be taken as an ID of contents provided by the first providing means of the first content providing apparatus.

Provision information can be taken as an ID of contents provided by the first providing means of the first content providing apparatus, and control information for controlling utilization of contents, or apparatus information indicating an apparatus that controls utilization of contents.

Control information is to be utilization indication information indicating predetermined utilization, or utilization permission information indicating permission or non-permission of predetermined utilization. It is possible to have the second providing means of the second content providing apparatus provide contents stored by the storing means and control information, to the content utilizing apparatus. It is possible to have the second obtaining means of the content utilizing apparatus obtain, in response to a request by the third requesting means, contents and control information provided by the second providing means of the second content providing apparatus. It is possible to have the utilizing means utilize contents on the basis of control information.

Utilization indication information can be taken as information indicating utilization of any one of reproduce, stop, temporary stop, fast-forward, or rewind, store, or printing of contents. Utilization permission information can be taken as information indicating permission or non-permission of utilization of any one of reproduce, stop, temporary stop, fast-forward, or rewind, store, or printing.

Apparatus information is to be information indicating one apparatus of the first content providing apparatus, the second content providing apparatus, and the content utilizing apparatus. It is possible to have the utilizing means of the content utilizing apparatus utilize contents obtained by the second obtaining means, in accordance with control of an apparatus indicated by apparatus information.

To the first content providing apparatus, it is possible to add designating means for designating contents provided by the first providing means. It is possible to have the sending means send, in response of a request, provision information of contents designated by the designating means, to the second content providing apparatus.

To the second content providing apparatus, it is possible to add designating means for designating provision of contents that are currently provided to the content utilizing apparatus by the first providing means of the first content providing apparatus, or provision of contents that are currently utilized by the utilizing means of the content utilizing apparatus. It is possible to have the second requesting means request provision designated by the designating means from the first content providing apparatus. It is possible to have the sending means of the first content providing apparatus send the second content providing apparatus, in response to a request by the second requesting means of the second content providing apparatus, contents that are currently provided to the content utilizing apparatus by the first providing means, or provision information of contents that are currently utilized by the utilizing means of the content utilizing apparatus.

In the second content providing system of the present invention, by the first content providing apparatus, contents are provided, in response to a request, to the second content providing apparatus or the content utilizing apparatus. In response to a request, provision information about contents provision is sent to the second content providing apparatus. By the second content providing apparatus, contents provision is requested to the first content providing apparatus. Provision information sent in response to a request is received, and provision of contents corresponding to the received provision information is requested to the first content providing apparatus. Contents provided in response to a request are obtained. The obtained contents are stored and the stored contents are provided to the content utilizing apparatus. By the content utilizing apparatus, a content provision is requested to the first content providing apparatus or the second content providing apparatus, and contents provided in response to a request are obtained and the obtained contents are utilized.

An information processing apparatus of the present invention is characterized by including determination means for determination whether it is in a content standby-mode or not; first executing means for executing a utilization process, when determined as in the standby-mode by the determination means, taking it that a user's permission is obtained, and second executing means for executing a predetermined permission validation process for obtaining a user's permission when determined as not in the standby-mode by the determination means, and executing the utilization process when the user's permission is obtained by that process.

The utilization process can be taken as a receiving process for receiving contents, a display process for displaying the contents, and a registration process for registering the contents. The permission validation process can be taken as a presentation process for presenting a user a dialog for obtaining permission.

An information processing method of the present invention is characterized by including a determination step of determinating whether it is in a content standby-mode or not; a first execution step of executing a utilization process, when determined as in the standby-mode in the determination step, taking it that a user's permission is obtained; and a second execution step of executing a predetermined permission validation process for obtaining a user's permission when determined as not being the standby-mode in the process of the determination step, and executing the utilization process when the user's permission is obtained by that process.

A program of a storage medium of the present invention is characterized by including: a determination control step of controlling determination as to whether it is in a content standby-mode or not; a first execution control step of controlling execution of a utilization process, when determined as in the standby-mode in the process of the determination control step, taking it that a user's permission is obtained; and a second execution control step of controlling execution of a predetermined permission validation process for obtaining a user's permission when determined as not in the standby-mode in the process of the determination control step, and controlling execution of the utilization process when the user's permission is obtained by that process.

A program of the present invention is characterized by having a computer execute process including: a determination control step of controlling determination as to whether it is in a content standby-mode or not; a first execution control step of controlling execution of a utilization process, when determined as in the standby-mode in the process of the determination control step, taking it that a user's permission is obtained; and a second execution control step of controlling execution of a predetermined permission validation process for obtaining a user's permission when determined as not in the standby-mode in the process of the determination control step, and controlling execution of the utilization process when the user's permission is obtained by that process.

In the apparatus and the method for information processing, and the program in the present invention, there is determined whether it is in a content standby-mode or not. The utilization process is executed when determined as in the standby-mode, taking it that a user's permission is obtained. A predetermined permission validation process for obtaining a user's permission is executed when determined as not in the standby-mode, and the utilization process is executed when the user's permission is obtained by that process.

BRIEF DESCRIPTION OF DRAWINGS

FIG. 2 is a diagram showing a communication group forming information;

FIG. 3 is a diagram showing a control condition;

BEST MODE FOR CARRYING OUT THE INVENTION

Figure 1:
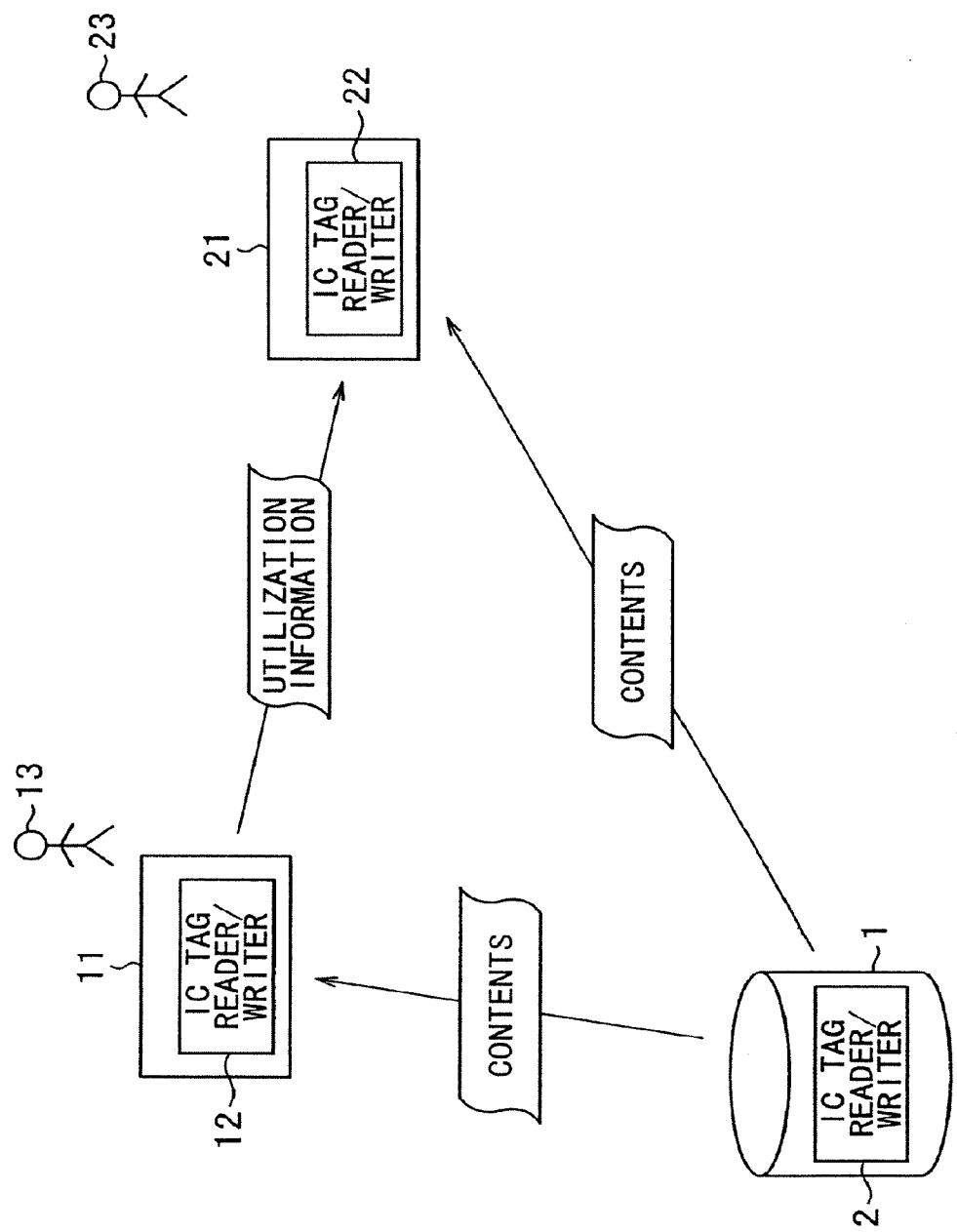
FIG. 1 is a diagram showing an example of utilization of a content providing system to which the present invention is applied.

FIG. 1 shows an example of utilization of a content providing system to which the present invention is applied.

A storage terminal 1 performs, by use of a self-contained IC tag reader/writer 2, close range communication with an IC tag reader/writer 12 contained in an operational terminal 11 or an IC tag reader/writer 22 contained in an operational terminal 21. The storage terminal 1 supplies communication setting information for establishing, for example, radio communication of IEEE802.11 standard and, in response to a communication setting process in the operational terminal 11 or the operational terminal 21 on the basis of the supplied communication setting information, establishes the radio communication therewith. The storage terminal 1 supplies, in response to a request, holding contents, for example, AV data such as voices and moving images, static images such as photographs taken by a digital camera or the like, visiting card information, address information, etc., to the operational terminal 11 or the operational terminal 21 via the established radio communication.

Note that the communication range in wireless LAN of IEEE802.11 standard is generally within several tens of meters.

The operational terminal 11 performs, by use of the self-contained IC tag reader/writer 12, the close range communication with the IC tag reader/writer 2 of the storage terminal 1, and receives communication setting information sent from the storage terminal 1, and also performs a communication establishment process based thereon, thereby establishing the radio communication of IEEE802.11 standard with the storage terminal 1. The operational terminal 11 receives via the established radio communication provision of desired contents from the storage terminal 1, and utilizes them.

The operational terminal 11 also performs, by use of the IC tag reader/writer 12, the close range communication with the IC tag reader/writer 22 contained in the operational terminal 21, and sends the operational terminal 21, in response to a request, communication setting information for establishing the radio communication with the storage terminal 1, and utilization information of contents that are being utilized by the operational terminal 11.

The operational terminal 21 performs, by use of the self-contained IC tag reader/writer 22, close range communication with the IC tag reader/writer 12 of the operational terminal 11, and receives the communication setting information for establishing the radio communication with the storage terminal 1, and the content utilization information, which are sent from the operational terminal 11. The operational terminal 21 establishes, on the basis of the received communication setting information, the radio communication of IEEE802.11 standard with the storage terminal 1, and receives from the storage terminal 1 contents corresponding to the utilization information (for example, the contents identical with that is being provided to the operational terminal 11), and utilizes them.

An ID of contents (for example, an ID of contents that the operational terminal 11 is currently receiving provision from the storage terminal 1, or an ID of contents that the operational terminal 11 is currently utilizing) is contained in the utilization information that is sent from the operational terminal 11 to the operational terminal 21.

It is possible to have the utilization information contain information for controlling utilization of contents (control information), or information indicating an apparatus that controls utilization of contents (apparatus information).

The control information is information indicating predetermined utilization (utilization indication information), or information indicating permission or non-permission of predetermined utilization (utilization permission information). The operational terminal 21 utilizes the contents provided from the storage terminal 1, on the basis of the control information contained in the utilization information.

The utilization indication information is information indicating, for example, reproduce (display), stop, temporary stop, fast-forward, or rewind, or store etc. If contents are static images, the utilization indication information is information indicating printing of the static images. Hereat, by having a mode of utilization indicated by the utilization indication information correspond to utilization in the operational terminal 11, it is possible to have the utilization in the operational terminal 21 correspond to the utilization in the operational terminal 11.

The utilization permission information is information indicating that, for example, reproduce, stop and temporary stop are permitted, but fast-forward and rewind are not permitted. Alternatively, if contents are static images, the utilization permission information is information indicating that printing of the static images is permitted or not permitted.

The apparatus information is information indicating, for example, the storage terminal 1, the operational terminal 11, or the operational terminal 21. The utilization of the operational terminal 21 is controlled by this information. That is, it is possible to configure such that the storage terminal 1 or the operational terminal 11 controls a content utilization process in the operational terminal 21.

The control of the utilization process in the operational terminal 21 is executable by a plurality of apparatuses, and it is also changeable by a predetermined action.

Communication group forming information as information necessary when performing a communication setting, which is shown in FIG. 2, and a control condition as a control condition of the communication group forming information, which is shown in FIG. 3, are contained in communication setting information interchanged among the storage terminal 1, the operational terminal 11, and the operation terminal 21.

The communication group forming information (FIG. 2) is composed of a network name, an SSID, a WEP key, and a communication network mode.

The network name is a title for identifying communication network of wireless LAN, and it is taken to be "TEST GROUP" in the example of FIG. 2.

The SSID (service set identification) is an ID for identifying wireless LAN of IEEE802.11 standard, and it is taken to be "0x123456" in the example of FIG. 2. Hereat, the SSID is set to the storage terminal 1, the operational terminal 11, and the operational terminal 21, respectively, and a communication is possible only when the SSIDs of both communicating each other coincide.

The WEP (wired equivalent privacy) key is authentication information necessary for communication group participation, and it is taken to be "0x1234567890" in the example of FIG. 2. Hereat, when making communication among the storage terminal 1, the operational terminal 11, and the operational terminal 21, data to be communicated is encrypted by using a common WEP key, and then communicated. Therefore, even if the communication data is monitored by equipment not having the common WEP key, the communication data cannot be decoded.

As the communication group mode, either mode of an infrastructure mode or an AdHoc mode is designated. The "AdHoc mode" is designated in the example of FIG. 2.

The control conditions (FIG. 3) is composed of a related URI, a hold permission, a provision permission, a communication valid period, an information valid period, and an information update condition.

The related URI is an URI (uniform resource identifier) related to the communication group forming information of FIG. 3.

The hold permission is information specifying, for example, whether, when the operational terminal 11 or the operational terminal 21 obtains the communication setting information, it is possible or not to hold this communication setting information. In the example of FIG. 3, hold is "permitted".

The provision permission is information specifying, for example, whether it is possible or not to provide to other equipment the communication setting information that the operational terminal 11 or the operational terminal 21 obtains and holds. In the example of FIG. 3, provision is "permitted".

The communication valid period is a communication valid period in which, for example, the operational terminal 11 or the operational terminal 21 can make communication by the communication setting performed on the basis of the obtained communication group forming information. In the example of FIG. 3, the communication is possible until it is disconnected on May 6, 2002.

The information valid period indicates, for example, an information valid period of the communication group forming information itself that is held by the operational terminal 11 or the operational terminal 21. In the example of FIG. 3, hold is possible until it is discarded on Apr. 5, 2002.

The information update condition indicates an information update condition, in other words, indicates a condition under which the communication group forming information already held should be updated to newly obtained communication group forming information, for example, if obtained communication group forming information similar to the communication group forming information that the operational terminal 11 or the operational terminal 21 holds. In the example of FIG. 3, if all the communication group forming information except for the WEP key are identical, the already holding communication group forming information is updated with the newly obtained communication group forming information.

In the case of this example, the communication setting information for establishing the radio communication of IEEE802.11 standard is interchanged via the IC tag reader/writer. It is also possible to interchange the communication setting information by using, for example, a short range communication type device such as RF-ID IC tag radio communication, or Bluetooth (registered trademark) communication that is subjected to expansion so as to take only a short range terminal as a communication object by suppressing electromagnetic wave radiation; a directional communication type device that specifies a more suitable other terminal for the purpose of directional communication not radial, such as optical communication by IrDA; or a media replacement type device in which information for communicating on a communication interface capable of communicating with other information process terminal is stored in a storage medium such as a memory stick, a smart media, CompactFlash (registered trademark), or an SD memory card, and there is configured by a reader/writer corresponding to their respective storage media.

Further, in the case of this example, contents are sent and received via the radio communication of IEEE802.11 standard. However, it is also possible to exchange contents on an IP network or the like, which is formed by use of radio communication for RF-ID IC tag (which is possible when the size of contents interchanged are small), optical communication such as IrDA, Bluetooth communication, IEEE802.11a, and IEEE802.11b, alternatively, cables such as IEEE1394, Ethernet (registered trademark), HomePNA, and PowerLine.

Note that when utilizing the Bluetooth communication, contents can be sent and received only by the Bluetooth communication, thereby enabling to simplify an apparatus configuration.

Figure 4:
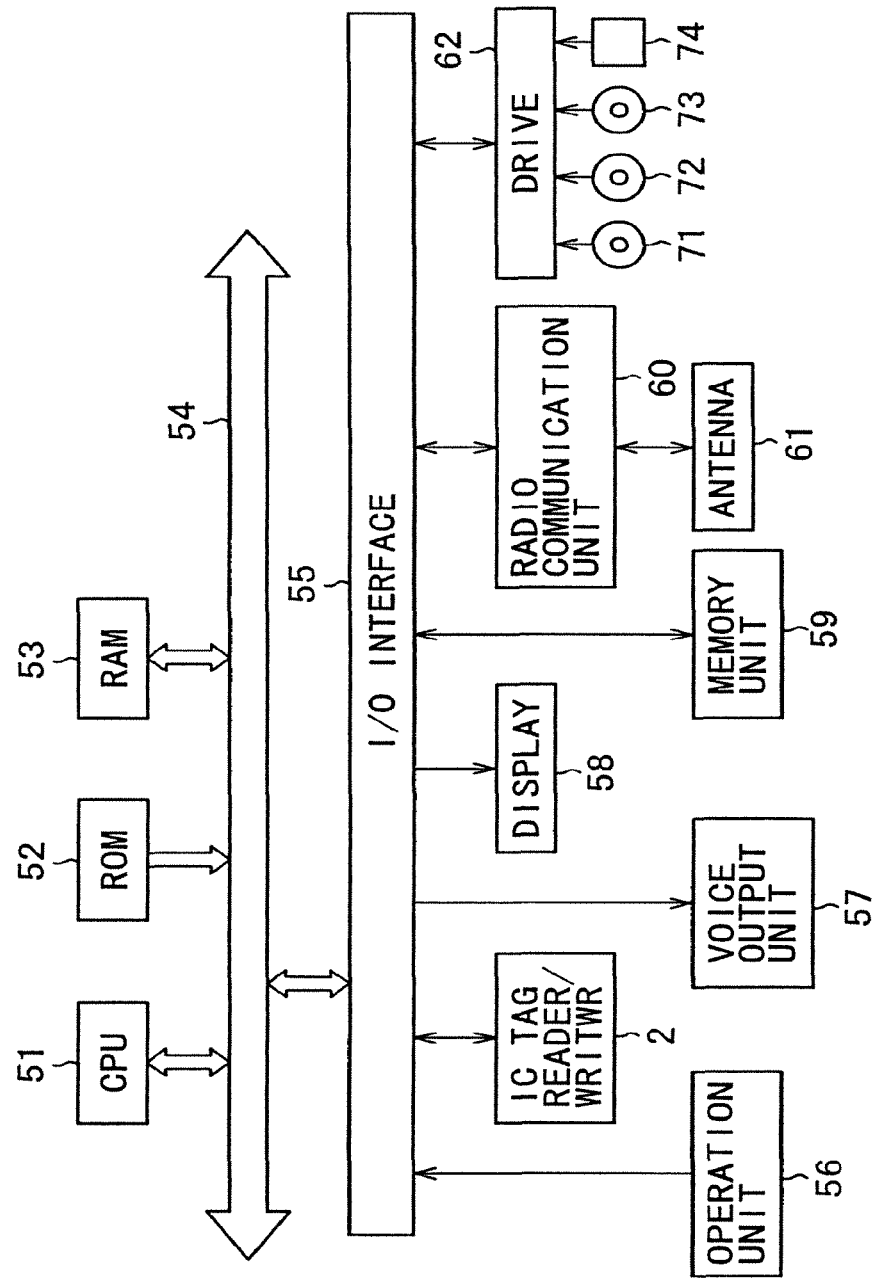
FIG. 4 is a block diagram showing an example of the configuration of a storage terminal 1 of FIG. 1.

FIG. 4 shows an example of the configuration of the storage terminal 1. A CPU 51 executes a variety of processes in accordance with programs stored in a ROM 52, or programs loaded from a memory unit 59 to a RAM 53. Data and the like required when the CPU 51 executes a variety of processes are also properly stored in the RAM 53.

The CPU 51, the ROM 52, and the RAM 53 are connected to each other via a bus 54. An input/output interface 55 is also connected to the bus 54.

To the input/output interface 55, there is connected an IC tag reader/writer 2 that communicates with the IC tag reader/writer 12 of the operational terminal 11 or the IC tag reader/writer 22 of the operational terminal 21; an operation unit 56 made up of a keyboard for receiving operational input from a user, and a mouse; a voice output unit 57 for outputting voices; a display 58 composed of a CRT (cathode-ray tube), an LCD (liquid crystal display) and the like; a memory unit 59 for storing contents and the like, which is composed of a hard disk, etc.; and a radio communication unit 60 that performs the radio communication of IEEE802.11 standard via an antenna 61.

Further, to the input/output interface 55, as required, a drive 62 is connected and there is suitably mounted such as a magnetic disk 71, an optical disk 72, a magneto-optical disk 73, or a semiconductor memory 74. Programs read therefrom are, as required, installed to the memory unit 59.

Figure 5:
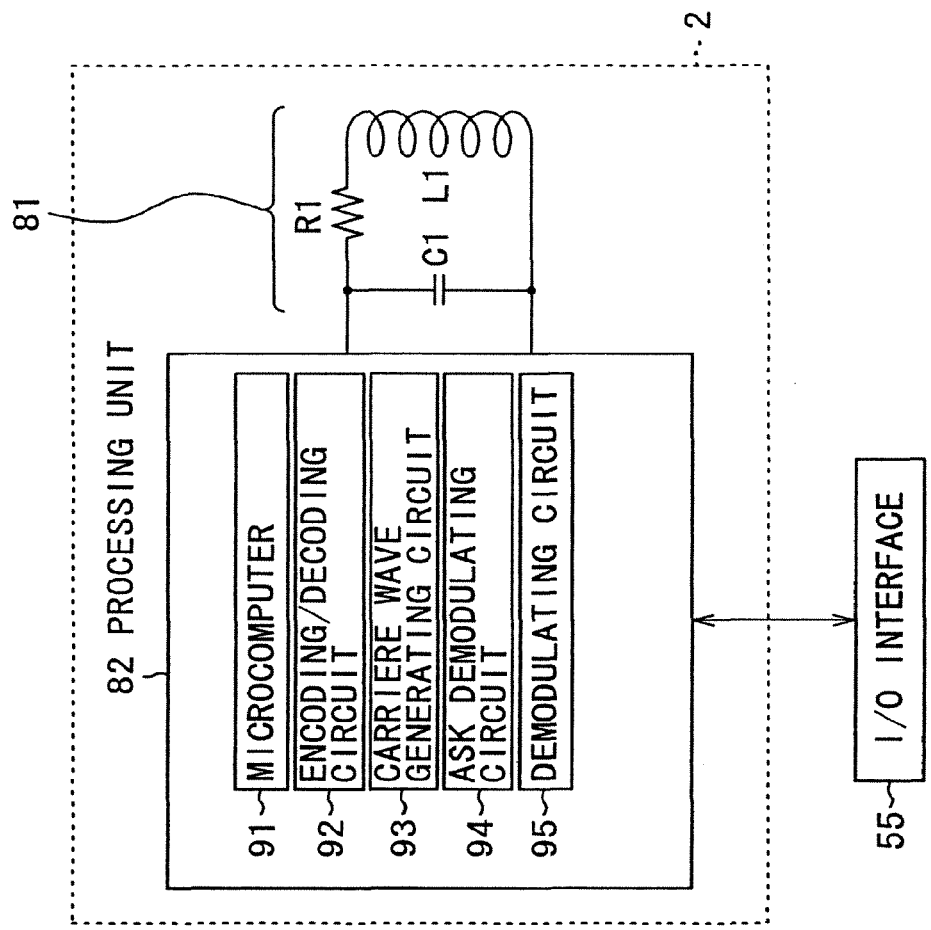
FIG. 5 is a block diagram showing an example of the configuration of an IC tag reader/writer 2 of FIG. 1.

FIG. 5 shows an example of the configuration of the IC tag reader/writer 2 of the storage terminal 1.

An antenna resonant circuit unit 81 has a resistor R1, a capacitor C1, and a coil L1, and sends an information signal generated by a processing unit 82 and electric power to an antenna resonant circuit unit of other IC tag reader/writer (for example, the IC tag reader/writer 12 of the operational terminal 11 or the IC tag reader/writer 22 of the operational terminal 21). The antenna resonant circuit unit 81 also receives an information signal from an antenna resonant circuit unit of other IC tag reader/writer, and then supplies it to the processing unit 82. A resonance frequency inherent in the antenna resonant circuit unit 81 (hereinafter referred to as an "inherent resonance frequency") is previously set to a predetermined value by the capacitance of the capacitor C1 and the inductance of the coil L1.

A microcomputer 91 of the processing unit 82 controls respective sections of the IC tag reader/writer 2, and has them perform a process for sending and receiving data. An encoding/decoding circuit 92 encodes data supplied via the input/output interface 55, as a Manchester code, and also decodes an information signal that is received and demodulated by a decoding circuit 95, and supplies the obtained data via the input/output interface 55 to respective sections of other IC tag reader/writer. A carrier wave generating circuit 93 generates a carrier wave to be sent to other IC tag reader/writer, and supplies it to an ASK modulation circuit 94. The ASK (amplitude shift keying) modulation circuit 94 performs amplitude modulation of the carrier wave supplied from the carrier wave generating circuit 93, on the basis of the signal encoded by the encoding/decoding circuit 92, and then supplies it to the antenna resonant circuit unit 81.

The decoding circuit 95 decodes the signal received by the antenna resonant circuit unit 81, and supplies it to the encoding/decoding circuit 92.

Figure 6:
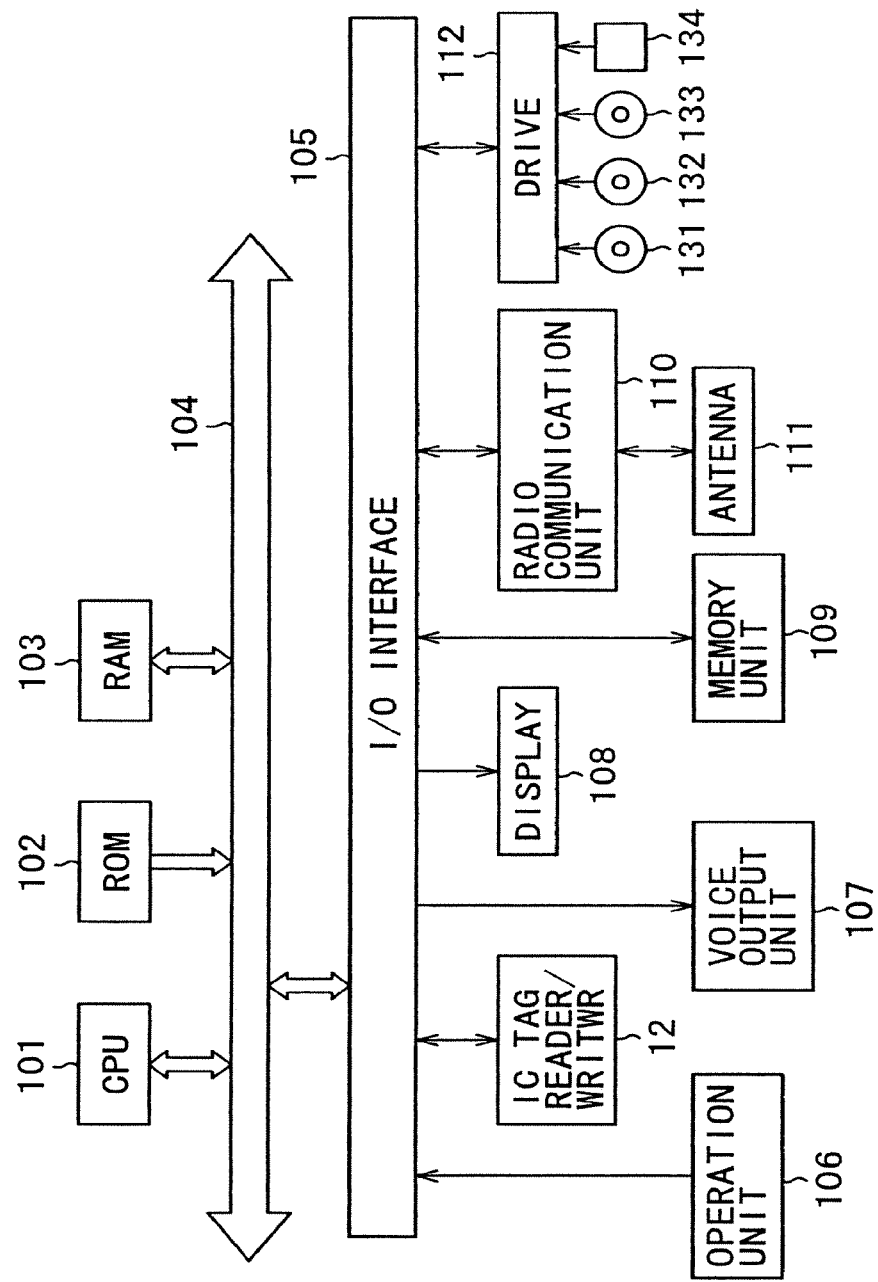
FIG. 6 is a block diagram showing an example of the configuration of an operational terminal 11 of FIG. 1.
Figure 7:
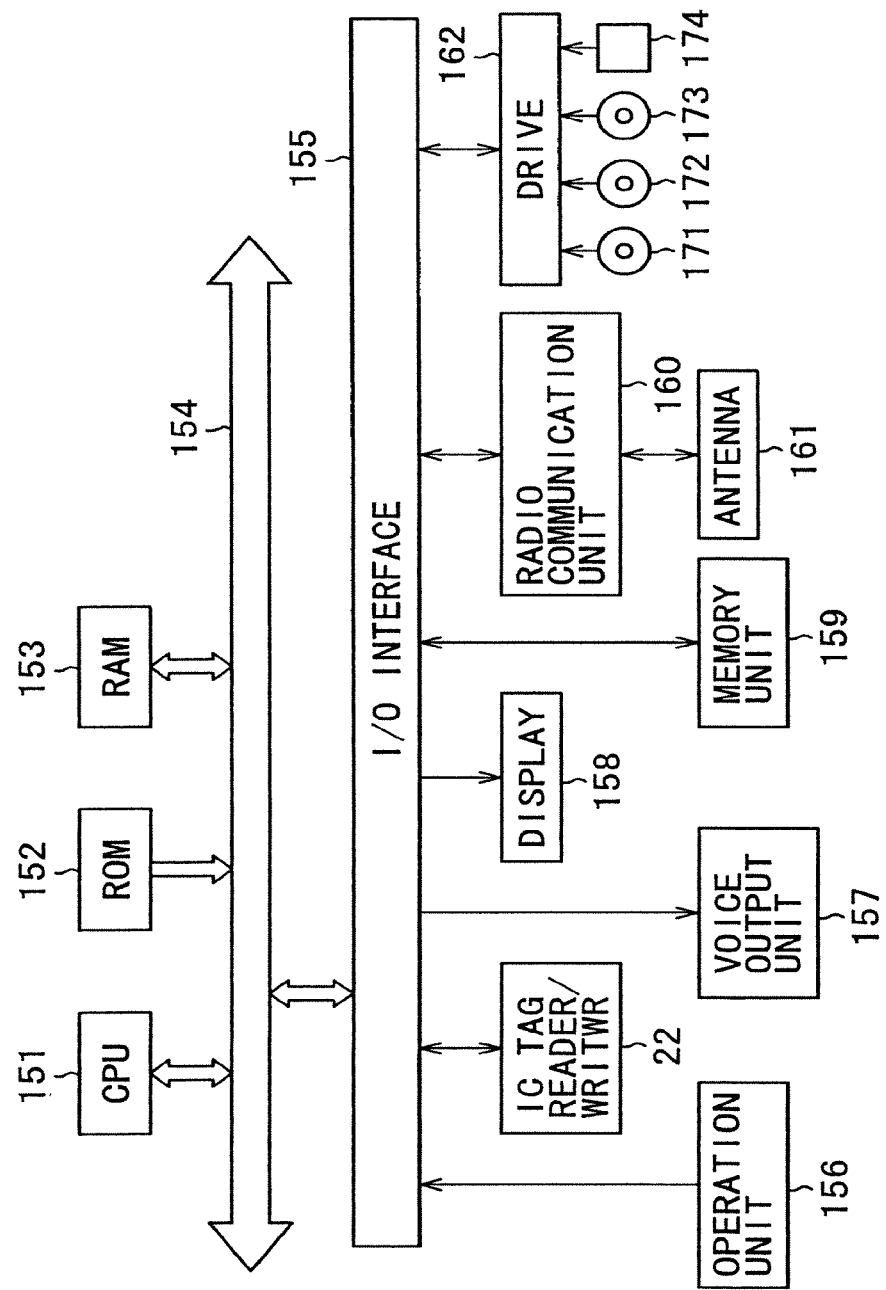
FIG. 7 is a block diagram showing an example of the configuration of an operational terminal 21 of FIG. 1.

FIG. 6 shows an example of the configuration of the operational terminal 11. FIG. 7 shows an example of the configuration of the operational terminal 21. The configurations of the operational terminal 11 and the operational terminal 21 are basically similar to the configuration of the storage terminal 1 shown in FIG. 4, and therefore description thereof is omitted. The configuration of the IC tag reader/writer 12 of the operational terminal 11 and the configuration of the IC tag reader/writer 22 of the operational terminal 21 are also similar to the IC tag reader/writer 2 of the storage terminal 1 shown in FIG. 5, and therefore depiction and description thereof are omitted.

An outline of the operations of the storage terminal 1, the operational terminal 11, and the operational terminal 21 in the example of utilization shown in FIG. 1 will next be described by referring to a flow chart in FIG. 8.

In step S1, when the operational terminal 11 is held very close to the storage terminal 1, the communication setting information is sent, by non-contact communication, from the IC tag reader/writer 2 of the storage terminal 1 to the IC tag reader/writer 12 of the operational terminal 11. Based on the communication setting information, the radio communication of IEEE802.11 standard is established between the storage terminal 1 and the operational terminal 11. The storage terminal 1 supplies, in response to a request, predetermined contents to the operational terminal 11 via the established radio communication, and the operational terminal 11 receives the contents from the storage terminal 1.

In other words, a user 13 designates contents that he/she desires to watch and listen to on the operational terminal 11 by operating, for example, an operation unit 106 of the operational terminal 11, and then holds the operational terminal 11 very close to the storage terminal 1. Thus, the user 13 can receive provision of the contents from the storage terminal 1, and watch and listen to them on the operational terminal 11.

Here, contents desired to watch and listen to can also be designated on the storage terminal 1.

In step S2, for example, if the operational terminal 21 is held very close to the operational terminal 11 when in the process of step S1, the radio communication is established between the storage terminal 1 and the operational terminal 11, the communication setting information sent from the storage terminal 1 to the operational terminal 11 in step S1, and the utilization information of the contents that are currently provided, for example, from the storage terminal 1 to the operational terminal 11 are sent, by the non-contact communication, from the IC tag reader/writer 12 of the operational terminal 11 to the IC tag reader/writer 22 of the operational terminal 21. Based on the communication setting information sent from the operational terminal 11 to the operational terminal 21, the radio communication of IEEE802.11 standard is established between the storage terminal 1 and the operational terminal 21. The storage terminal 1 provides to the operational terminal 21, in response to a request, the contents corresponding to the utilization information (for example, the contents that are currently provided to the operational terminal 11, or the contents that are currently utilized). The operational terminal 21 receives the provision of the contents from the storage terminal 1, and utilizes them.

For example, if a user 23 is interested in the contents that the user 13 is watching and listening to on the operational terminal 11, and desires to watch and listen to them, the user 23 can watching and listening to, on the operational terminal 21, the contents that the user 13 is watching and listening to, by holding the operational terminal 21 very close to the operational terminal 11, or holding the operational terminal 11 very close to the operational terminal 21.

Since in the process herein the contents are treated as being copied from the operational terminal 11 to the operational terminal 21, the process herein is referred to, for convenience, as a content copy process.

Details of the process of step S1 in FIG. 8 will next be described by referring to a flow chart in FIG. 9.

In step S11, the CPU 51 of the storage terminal 1 instructs the IC tag reader/writer 2 to initiate detection of an operational terminal. By the instruction, the IC tag reader/writer 2 initiates output of electromagnetic wave for the operational terminal detection. Hereat, the operational terminal detection may be initiated when the user 13 performs a predetermined operation to the operation unit 56 of the storage terminal 1. Alternatively, it is possible to configure so as to be initiated when the power source of the storage terminal 1 is turned on.

A CPU 101 of the operational terminal 11 waits until the electromagnetic wave for the operational terminal detection is received by the IC tag reader/writer 12 in step S21, and proceeds to step S22 when the IC tag reader/writer 12 receives the electromagnetic wave by that, for example, the operational terminal 11 (the IC tag reader/writer 12) is held in close range of the storage terminal 1 (the IC tag reader/writer 2) by the user 13.

The CPU 101 of the operational terminal 11 has a display 108 display a dialog for obtaining permission of the reception of contents in step S22, and determines whether the reception of contents is permitted or not in step S23.

The user 13 inputs his/her intention to permit the reception of the contents, or his/her intention not to permit the reception of the contents, to the dialog displayed in the process of step S22. Therefore, on the basis of the input, the CPU 101 determines whether the reception of the contents is permitted or not.

When in step S23 it is determined that the reception of the contents is permitted, there proceeds to step S24.

When the user 13 receives the content provision from the storage terminal 1, and watches at and listens to them on the operational terminal 11, the user 13 inputs his/her intention to permit the reception of the contents to the dialog displayed in step S22, and therefore proceeds to step S24.

In step S24, the CPU 101 of the operational terminal 11 sends a response signal via the IC tag reader/writer 12 (the antenna resonant circuit unit).

The CPU 51 of the storage terminal 1 waits until the response signal is received by the IC tag reader/writer 2 in step S12, that is, until an operational terminal (precisely, an operational terminal that requests a content provision) in step S12, and proceeds to step S13 when the response signal is received, that is, when an operational terminal is detected, and then reads the communication setting information stored in the memory unit 59 and supplies it to the IC tag reader/writer 2. The IC tag reader/writer 2 sends the supplied communication setting information to the operational terminal 11.

Hereat, the CPU 51 may terminate the process of the operational terminal detection when no operational terminal is detected within a time limit, instead of waiting until an operational terminal is detected in step S12.

In step S25, the CPU 101 of the operational terminal 11 waits until the communication setting information is received by the IC tag reader/writer 12. When it is received, the CPU 101 proceeds to step S26, and has a memory unit 109 store it.

Next, in step S27, the CPU 101 of the operational terminal 11 controls a radio communication unit 110 so as to execute the communication setting of the radio communication of IEEE802.11 standard on the basis of the communication group forming information contained in the communication setting information stored in the memory unit 109 in step S26. At this time, the radio communication unit 60 of the storage terminal 1 executes, in step S14, a communication setting process corresponding to the process in the radio communication unit 110 of the operational terminal 11 in step S27. As a result, the radio communication between the storage terminal 1 and the operational terminal 11 is established.

In step S28, the CPU 101 of the operational terminal 11 controls the radio communication unit 110 so as to send a content ID of the contents designated by the operation unit 106 (the contents that the user 13 desires to watch and listen to on the operational terminal 11) to the storage terminal 1 via the radio communication established in the process of step S27.

The CPU 51 of the storage terminal 1 reads the contents having the content ID sent from the operational terminal 11, from the memory unit 59 in step S15, and also controls the radio communication unit 60 so as to initiate sending of the read contents to the operational terminal 11. That is, the data of the contents designated by the user 13 is sent from the storage terminal 1 to the operational terminal 11 via the radio communication established in step S14. Thereafter, the process of the CPU 51 of the storage terminal 1 is terminated.

In step S29, the CPU 101 of the operational terminal 11 controls the radio communication unit 110 so as to initiate receiving of the data of the contents sent from the storage terminal 1.

Next, in step S30, the CPU 101 of the operational terminal 11 has the display 108 display a dialog for obtaining permission of the display of the contents that are currently received. In step S31, it determines whether the display of the contents is permitted or not.

The user 13 inputs his/her intention to permit the display of the contents, or his/her intention not to permit the display of the contents, to the dialog displayed in the process of step S30. Therefore, on the basis of the input, the CPU 101 determines whether the display of the contents is permitted or not.

When it is determined that the display of the contents is permitted in step S31, there proceeds to step S32, and the CPU 101 of the operational terminal 11 initiates a display process for displaying the received contents on the display 108. Thus, the user 13 can watch and listen to the designated contents.

When it is determined that the display of the contents is not permitted in step S31, or when the display process for displaying the contents is initiated in step 32, there proceeds to step S33, and the CPU 101 of the operational terminal 11 has the display 108 display a dialog for obtaining permission of registration of the received contents.

In step S34, the CPU 101 of the operational terminal 11 determines whether the registration of the received contents is permitted or not. The user 13 inputs his/her intention to permit the registration of the contents, or his/her intention not to permit the registration of the contents, to the dialog displayed in the process of step S33. Therefore, on the basis of the input, the CPU 101 determines whether the registration of the contents is permitted or not.

When it is determined that the content registration is permitted in step S34, there proceeds to step S35, and the CPU 101 of the operational terminal 11 initiates process for registering (storing) the received contents, or the received and displayed contents in the memory unit 109.

When it is determined that the reception of the contents is not permitted in step S23, or when it is determined that the registration of the contents is not permitted in step S34, or when the registration process for registering the contents is terminated in step S35, the process of the CPU 101 of the operational terminal 11 is terminated.

As above, the storage terminal 1 provides predetermined contents to the operational terminal 11 via the established radio communication, and the operational terminal 11 receives the provision of the contents from the storage terminal 1.

Details of the process (the copy process from the operational terminal 11 to the operational terminal 21) of step S2 in FIG. 8 will next be described by referring to a flow chart in FIG. 10.

The CPU 101 of the operational terminal 11 instructs, in step S61, the IC tag reader/writer 12 to initiate detection of an operational terminal. By that instruction, the IC tag reader/writer 12 initiates output of the electromagnetic wave for the operational terminal detection.

Figure 9:
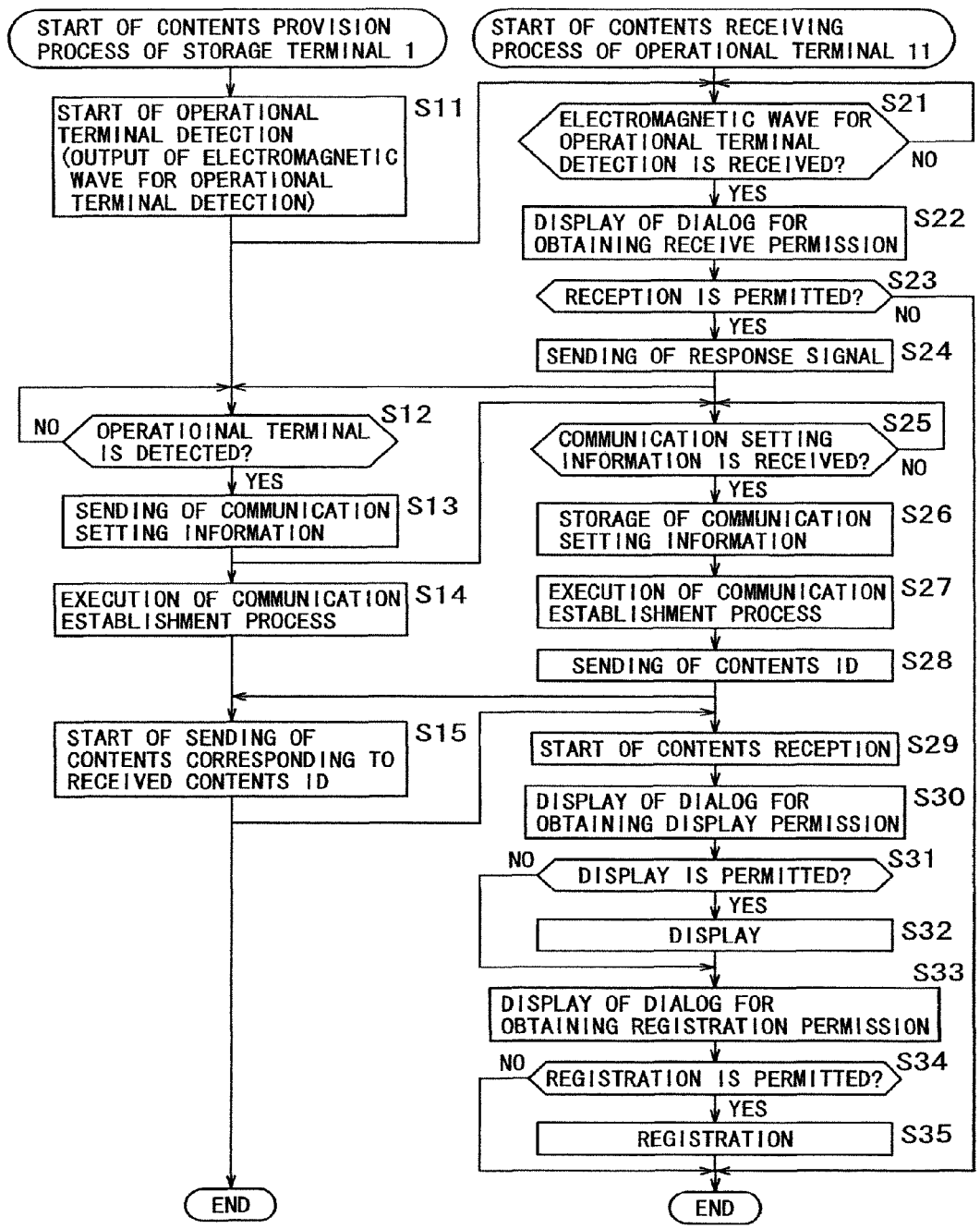
FIG. 9 is a flow chart illustrating details of the process of step S1 in FIG. 8.

The operational terminal detection herein may be initiated when the radio communication between the storage terminal 1 and the operational terminal 11 is established in the process shown by the flow chart in FIG. 9. Alternatively, it is possible to configure so as to be initiated when a predetermined operation to the operation unit 106 of the operational terminal 11 is executed by the user 13.

In step S71, the CPU 151 of the operational terminal 21 determines whether the electromagnetic wave for the operational terminal detection outputted from the operational terminal 11 by the IC tag reader/writer 22 is received or not, and proceeds to step S72 when the IC tag reader/writer 22 receives the electromagnetic wave by, for example, that the operational terminal 11 (the IC tag reader/writer 12) is held in close range of the operational terminal 21 (the IC tag reader/writer 22) by the user 13, or that the operational terminal 21 is held in close range of the operational terminal 11 by the user 23.

In step S72, the CPU 151 of the operational terminal 21 has the display 158 display a dialog for obtaining permission of the reception of the contents. In step S73, it determines whether the reception of the contents is permitted or not.

When it is determined that the reception of the content is permitted in step S73, there proceeds to step S74, and the CPU 151 of the operational terminal 21 sends a response signal via the IC tag reader/writer 22 (the antenna resonant circuit).

The CPU 101 of the operational terminal 11 waits until the response signal is received by the IC tag reader/writer 12 in step S62, and proceeds to step S63 when the response signal is received.

In step S63, the CPU 101 of the operational terminal sends the operational terminal 21, via the IC tag reader/writer 12, the communication setting information that is stored in the memory unit 109 in step S26 in FIG. 9, sent from the storage terminal 1, and the utilization information containing, for example, a content ID of the contents that are currently provided from the storage terminal 1. Thereafter, the process of the CPU 101 of the operational terminal 11 is terminated.

Hereat, the content ID that is sent as the utilization information to the operational terminal 21 is not limited to the content ID of the contents that the operational terminal 11 is currently receiving provision, and may be a content ID of other contents corresponding to that contents.

In step S75, the CPU 151 of the operational terminal 21 waits until the communication setting information or the like is received by the IC tag reader/writer 22. When that is received, the CPU 151 proceeds to step S77, and has the memory unit 159 store it.

Next, in step S77, the CPU 151 of the operational terminal 21 controls the radio communication unit 160 so as to execute the communication setting of the radio communication of IEEE802.11 standard, on the basis of the communication group forming information contained in the communication setting information stored in the memory unit 159 in step S76 (i.e., the process for establishing the radio communication with the storage terminal 1). At this time, the CPU 51 of the storage terminal 1 controls, in step S51, the radio communication unit 60 so as to execute the radio communication setting process corresponding to the process in the radio communication unit 160 of the operational terminal 21 in step S77. As a result, the radio communication between the storage terminal 1 and the operational terminal 21 is established.

In step S78, the CPU 151 of the operational terminal 21 controls the radio communication unit 160 so as to send the content ID received in step S75 to the storage terminal 1 via the radio communication established in the process of step S77.

The CPU 51 of the storage terminal 1 reads the contents having the content ID sent from the operational terminal 21, from the memory unit 59 in step S52, and also controls the radio communication unit 60 so as to initiate sending of the read contents to the operational terminal 21. In other words, the contents that has been provided so far to the operational terminal 11 is also provided (copied) to the operational terminal 21.

The process of the CPU 51 of the storage terminal 1 is terminated thereafter.

In step S79, the CPU 151 of the operational terminal 21 controls the radio communication unit 160 so as to initiate receiving of the contents to be sent from the storage terminal 1.

Next, in step S80, the CPU 151 of the operational terminal 21 has the display 158 display a dialog for obtaining permission of the display of the contents that are currently received, and determines whether the display of the contents is permitted or not in step S81.

When it is determined in step S81 that the display of the contents is permitted, there proceeds to step S82, and the CPU 151 of the operational terminal 21 initiates a display process for displaying the received contents on the display 158.

When in step S81 it is determined that the display of the contents is not permitted, or when the display process is initiated in step S82, the CPU 151 of the operational terminal 21 has the display 158 display a dialog for obtaining permission of registration of the received contents in step S83.

In step S84, the CPU 151 of the operational terminal 21 determines whether the registration of the contents is permitted or not. When it is determined that the registration of the contents is permitted, the CPU 151 proceeds to step S85 and initiates the process for registering (storing) the received contents in the memory unit 159.

When it is determined in step S73 that the receiving of the contents is not permitted, or when it is determined in step S84 that the registration of the contents is not permitted, or when the registration process of the contents is terminated in step S85, the process of the CPU 151 of the operational terminal 21 is terminated.

As above, the contents that have been provided to the operational terminal 11 is copied onto and utilized in (displayed on and registered in) the operational terminal 21.

Hereat, disconnection of the radio communication between the storage terminal 1 and the operational terminal 11 is properly performed after the process of step S63. For example, this is executable by temporarily disconnecting the close range communication after the radio communication establishment, and resuming it by having the storage terminal 1 and the operational terminal 11 be close together again.

In the foregoing, the content ID is contained in the utilization information. However, as described above, it is possible to have the utilization information contain the control information for controlling utilization of contents (utilization indication information indicating predetermined utilization, or utilization permission information indicating permission or non-permission of predetermined utilization), and the apparatus information indicating an apparatus that controls utilization of the contents.

In the case of having the utilization information contain the control information, by setting, for example, the same utilization as the utilization of the contents that are currently be done in the operational terminal 11, to the control information, it is possible to have the operational terminal 21 utilize the contents in the similar condition as the operational terminal 11.

After the content provision to the operational terminal 21 is initiated, it is also possible to continue the content provision to the operational terminal 11. When the content provision to the operational terminal 21 is initiated, it is also possible to stop the content provision to the operational terminal 11.

In the foregoing, it is predetermined that the contents to be provided to the operational terminal 21 is the contents that the operational terminal 11 is currently receiving provision from the storage terminal 1, and there is configured such that the ID of that contents is sent in step S63. Therefore, the operational terminal 11 could perform sending of the ID of the contents in step S63, without waiting, for example, a content designation from a user.

However, it is also possible to designate the contents to be provided to the operational terminal 21 by the operational terminal 11 or the operational terminal 21. For example, it is possible to designate contents that the operational terminal 11 is currently utilizing, or contents or the like that the operational terminal 11 is currently receiving provision from the storage terminal 1.

In the meanwhile, if the operational terminal 21 is already executing other process (for example, in the case of receiving and displaying a television broadcast) when utilizing contents to be provided from the storage terminal 1, it is also possible, after stopping that process, to perform process for utilizing the above-mentioned contents, and resume the stopped process when the utilization of the contents is terminated.

Figure 11:
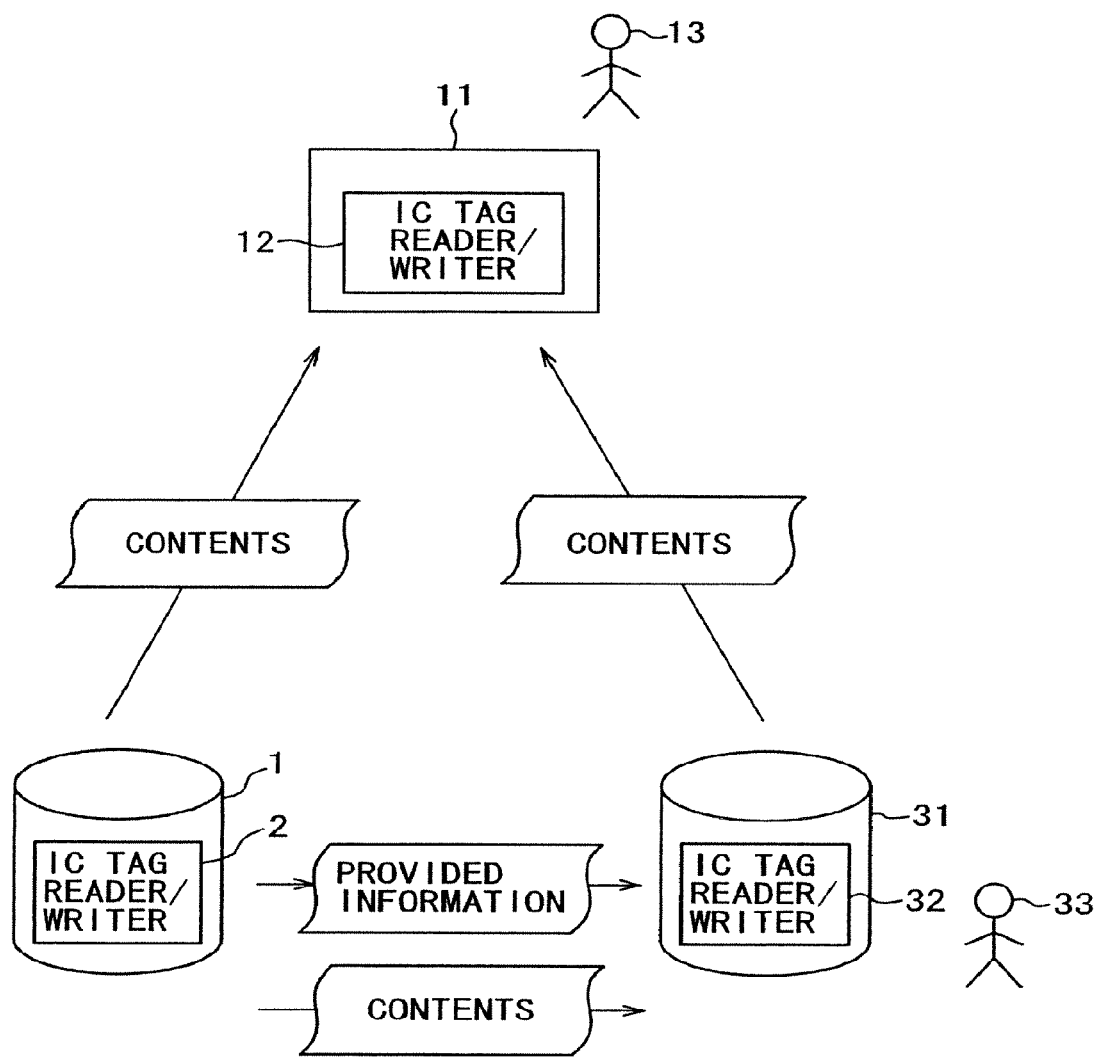
FIG. 11 is a diagram showing other example of utilization of the content providing system to which the present invention is applied.

FIG. 11 shows other example of utilization of a content providing system to which the present invention is applied.

A storage terminal 1 performs, by use of a self-contained IC tag reader/writer 2, close range communication with an IC tag reader/writer 12 contained in an operational terminal 11, and sends communication setting information for establishing radio communication of IEEE802.11 standard, and establishes radio communication with the operational terminal 11, in response to a communication setting process in the operational terminal 11 on the basis of the sent communication setting information. The storage terminal 1 provides holding contents to the operational terminal 11 via the established radio communication.

The storage terminal 1 also performs, by use of the IC tag reader/writer 2, the close range communication with an IC tag reader/writer 32 contained in a storage terminal 31, and sends the storage terminal 31 the communication setting information for establishing the radio communication with itself, and the communication setting information for establishing the radio communication with the operational terminal 11, as well as provision information of the contents provided to the operational terminal 11.

The storage terminal 1 establishes the radio communication with the storage terminal 31, in response to the communication setting process in the storage terminal 31 on the basis of the sent communication setting information. The storage terminal 1 provides, for example, the same contents as the contents that are being provided to the operational terminal 11, to the storage terminal 31 via the established radio communication.

The storage terminal 31 performs, by use of the IC tag reader/writer 32, the close range communication with the IC tag reader/writer 2 contained in the storage terminal 1, and receives the communication setting information that is sent from the storage terminal 1 in order to establish the radio communication with the storage terminal 1, and the communication setting information for establishing the radio communication with the operational terminal 11, together with the provision information.

The storage terminal 31 performs the communication setting process based on the received communication setting information for establishing the radio communication with the storage terminal 1, thereby establishing the radio communication with the storage terminal 1. Then, the storage terminal 31 receives from the storage terminal 1 the provision of the contents corresponding to the provision information (for example, the contents that the storage terminal 1 is providing to the operational terminal 11), and stores them.

The storage terminal 31 performs, in response to a request, the communication setting process based on the obtained communication setting information for establishing the radio communication with the operational terminal 11, thereby establishing the radio communication with the operational terminal 11. Then, the storage terminal 31 provides, via the radio communication, the contents provided from the storage terminal 1 to the operational terminal 11.

An ID of the contents (for example, an ID of the contents that the storage terminal 1 is currently providing to the operational terminal, or an ID of the contents that the operational terminal 11 is currently utilizing) is contained in the provision information of the contents sent from the storage terminal 1 to the storage terminal 31.

It is also possible to have the provision information contain information for controlling utilization of contents (control information), or information indicating an apparatus that controls utilization of contents (apparatus information).

The control information is, as in the case of the example of FIG. 1, information indicating predetermined utilization (utilization indication information), or information indicating permission or non-permission of predetermined utilization (utilization permission information). The storage terminal 31 is able to have the operational terminal 11 execute the utilization of the contents on the basis of the control information, by sending the operational terminal 11 the control information together with the contents.

The apparatus information is information indicating, for example, the storage terminal 1, the operational terminal 11, or the storage terminal 31. The storage terminal 31 is able to have the operational terminal 11 execute the utilization of the contents on the basis of the control of an apparatus indicated in the apparatus information, by sending the operational terminal 11 the operational information together with the contents.

The configuration of the storage terminal 31 is similar to the configuration of the storage terminal 1 (FIG. 4), and the configuration of the IC tag reader/writer 32 is similar to the configuration of the IC tag reader/writer 2 (FIG. 5), and therefore, their respective depictions and descriptions are omitted.

Figure 12:
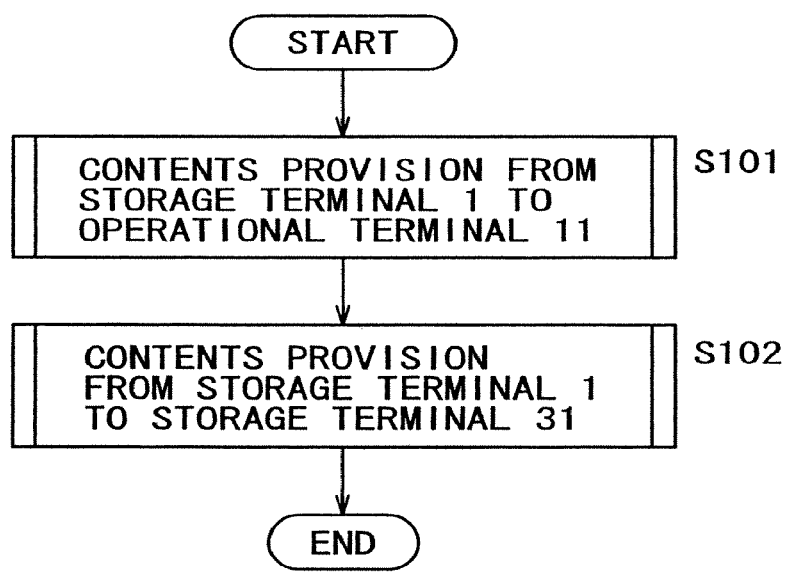
FIG. 12 is a flow chart illustrating operations of the storage terminal 1, an operational terminal 11, and a storage terminal 31 in the example of utilization in FIG. 11.

An outline of the operations of the storage terminal 1, the operational terminal 11, and the storage terminal 31 in the example of utilization shown in FIG. 11 will next be described by referring to a flow chart in FIG. 12.

Figure 8:
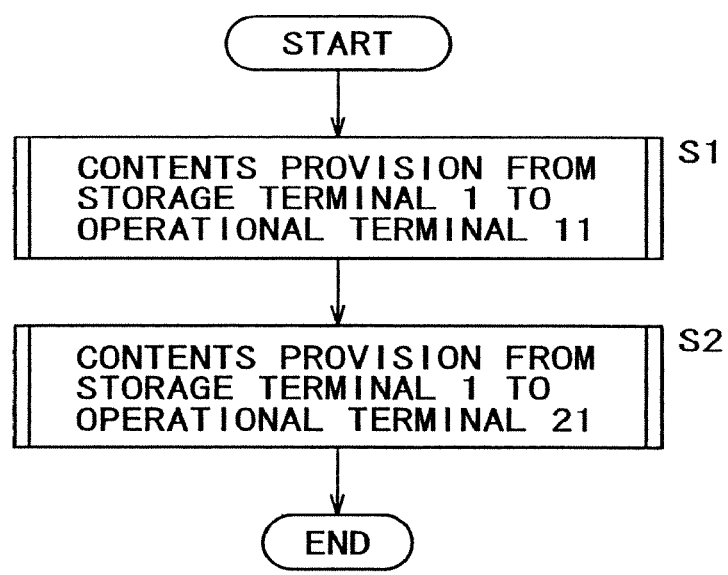
FIG. 8 is a flow chart illustrating operations of the storage terminal 1, the operational terminal 11, and the operational terminal 21 in the example of utilization in FIG. 1.

In step S101, the similar process as in the case of step S1 in FIG. 8 is performed, and therefore, a detailed description thereof is omitted. That is, the radio communication of IEEE802.11 standard is established between the storage terminal 1 and the operational terminal 11. The storage terminal 1 provides predetermined contents to the operational terminal 11 via the established radio communication, and the operational terminal 11 receives the provision of the contents from the storage terminal 1.

In step S102, when the radio communication between the storage terminal 1 and the operational terminal 11 is being established in the process of step S101, for example, if the storage terminal 31 is held very close to the storage terminal 1, the communication setting information for establishing the radio communication with the storage terminal 1 and provision information are sent, by non-contact communication, from the IC tag reader/writer 2 of the storage terminal 1 to the IC tag reader/writer 32 of the storage terminal 31. If the radio communication of IEEE802.11 standard between the storage terminal 1 and the storage terminal 31 is established on the basis of the communication setting information, the storage terminal 1 provides, in response to a request, the storage terminal 31 contents corresponding to the provision information (for example, the same contents as the contents that are being provided to the operational terminal 11), and the storage terminal 31 obtains provision of the contents from the storage terminal 1 and stores them.

Since the communication setting information for establishing the radio communication with the operational terminal 11 is sent, by the non-contact communication, from the storage terminal 1 to the storage terminal 31, the storage terminal 31 is able to provide the contents that have been provided from the storage terminal 1 and then stored, by performing the similar process as the storage terminal 1 shown in FIG. 9, to the operation terminal 11 in response to a request.

In other words, if a user 33 is interested in, for example, contents that a user 13 is watching and listening to, and desires to obtain it, the user 33 can store, in the storage terminal 31, the contents that the user 13 is watching and listening to, by holding the operational terminal 31 very close to the storage terminal 1, or the holding the storage terminal 1 very close to the storage terminal 31. The user 13 is also able to obtain the provision of contents from the storage terminal 31.

Also in the process herein, since the contents are treated as being copied from the storage terminal 1 to the storage terminal 31, this process is referred to, for convenience, as a content copy process.

The process of step S102 in FIG. 12 will next be described by referring to a flow chart in FIG. 13.

In step S111, the storage terminal 1 instructs the IC tag reader/writer 2 to initiate detection of an operational terminal. Concretely, the IC tag reader/writer 2 initiates to output electromagnetic wave for operational terminal detection. Hereat, the operational terminal detection may be initiated when the user 13 performs a predetermined operation to the storage terminal 1. Alternatively, it is possible to configure so as to be initiated when the power source of the storage terminal 1 is turned on.

The storage terminal 31 waits until the electromagnetic wave for operational terminal detection is received by the IC tag reader/writer 32 of the storage terminal 31 in step S121, and proceeds to step S122 when the IC tag reader/writer 32 receives the electromagnetic wave by that the storage terminal 1 (the IC tag reader/writer 2) is held in close range of the storage terminal 31 (the IC tag reader/writer 32), or that the storage terminal 31 is held in close range of the storage terminal 1.

In step S122, the storage terminal 31 displays a dialog for obtaining permission of the reception of contents and, in step S123, determines whether the reception of the contents is permitted or not.

When it is determined in step S123 that the reception of the contents is permitted on the basis of the input to the dialog, there proceeds to step S124, and the storage terminal 31 sends a response signal via the IC tag reader/writer 32.

The storage terminal 1 waits until the response signal is received by the IC tag reader/writer 2 in step S112, and proceeds to step S113 when the response signal is received.

In step S113, the storage terminal 1 sends the storage terminal 31 via the IC tag reader/writer 2, the communication setting information for establishing the radio communication with itself, which is stored in the memory unit 59, (the communication setting information supplied to the operational terminal 11 in step S13 of FIG. 9), and the communication setting information for establishing the radio communication with the operational terminal 11, as well as the provision information including, for example, a content ID of the contents that are currently providing to the operational terminal 11.

Hereat, the content ID to be sent to the storage terminal 31 as provision information may be, instead of being restricted to the ID of the contents that are currently providing to the operational terminal 11, an ID of other contents related thereto.

The storage terminal 31 waits until the communication setting information or the like is received by the IC tag reader/writer 32 in step S125, and when it is received, proceeds to step S126 and stores it.

Next, in step S127, the storage terminal 31 performs the communication setting process based on the communication setting information that was stored in step S126 in order to establish the radio communication with the storage terminal 1. At this time, the storage terminal 1 executes, in step S114, the communication setting process corresponding to the process in the storage terminal 31 in step S127. As a result, the radio communication is established between the storage terminal 1 and the storage terminal 31.

In step S128, the storage terminal 31 sends the content ID received in step S125 to the storage terminal 1 via the radio communication established in the process of step S127.

The storage terminal 1 reads from the memory unit 59 the contents having the content ID sent from the storage terminal 31, and initiates sending of the read contents to the storage terminal 31, in step S115. That is, for example, the contents that have been provided so far to the operational terminal 11 is also provided (copied) to the storage terminal 31.

In step S129, the storage terminal 31 initiates receiving of contents sent from the storage terminal 1.

Next, in step S130, the storage terminal 31 displays a dialog for obtaining permission of registration of the received contents. In step S131, it determines whether the registration of the contents is permitted or not.

When it is determined in step S131 that the registration of the contents is permitted on the basis of the input to the dialog, there proceeds to step S132, and the storage terminal 31 initiates process for registering the received contents.

When it is determined in step S123 that the reception of the contents is not permitted, or when it is determined in step S131 that the registration of the contents is not permitted, or when the process of registering the contents is terminated in step S132, the process of the storage terminal 31 is terminated.

As above, the storage terminal 1 provides also to the storage terminal 31, for example, the same contents as the contents that are being provided to the operational terminal 11, and the storage terminal 31 receives the provision of the contents from the storage terminal 1, and stores them. Further, the storage terminal 31 is able to provide, in response to a request, the contents stored on the reception of provision from the storage terminal 1, to the operational terminal 11.

Since the storage terminal 31 stores the communication setting information for establishing the radio communication with the operational terminal 11 in step S126, it can perform provision of contents to the operational terminal 11 in the similar process as the process of the storage terminal 1 shown in FIG. 9.

Although in the foregoing the content ID is contained in the provision information, it is possible to have the provision information contain the control information for controlling utilization of contents (utilization indication information indicating predetermined utilization, or utilization permission information indicating permission or non-permission of predetermined utilization), and the apparatus information indicating an apparatus that controls utilization of contents, as described above.

Although in the foregoing, it is predetermined that the contents to be provided to the operational terminal 31 are the contents that the operational terminal 11 is currently receiving provision from the storage terminal 1, and there is configured such that the ID of that contents is sent in step S113. Therefore, the storage terminal 1 could perform sending of the ID of the contents in step S113, without waiting, for example, contents designation from a user.

However, contents to be provided by the storage terminal 31 can also be designated by the storage terminal 1 or the storage terminal 31. For example, it is possible to designate contents that the operational terminal 11 is currently utilizing, or contents or the like that the operational terminal 11 is currently receiving provision from the storage terminal 1.

Figure 10:
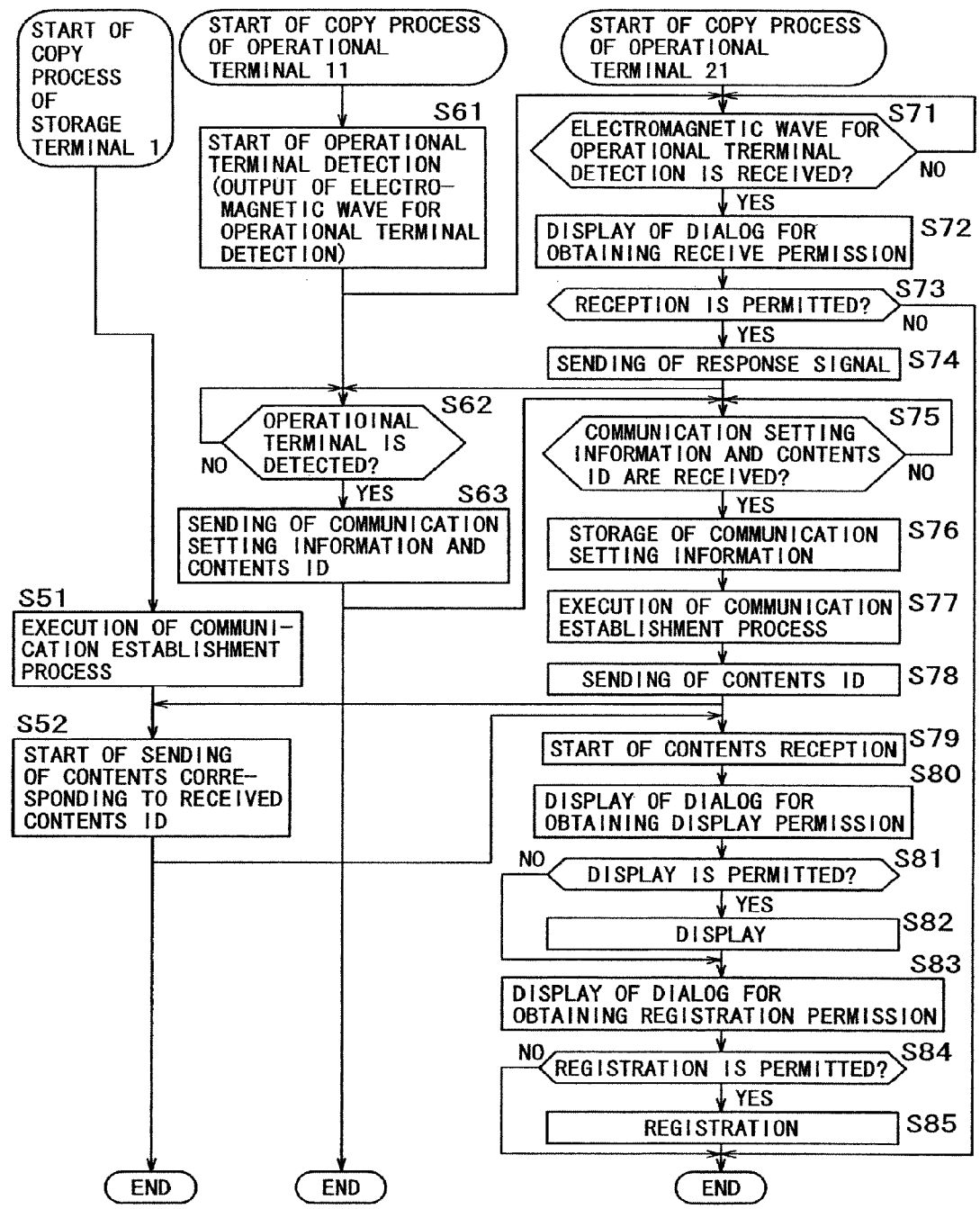
FIG. 10 is a flow chart illustrating details of the process in step S2 in FIG. 8.
Figure 13:
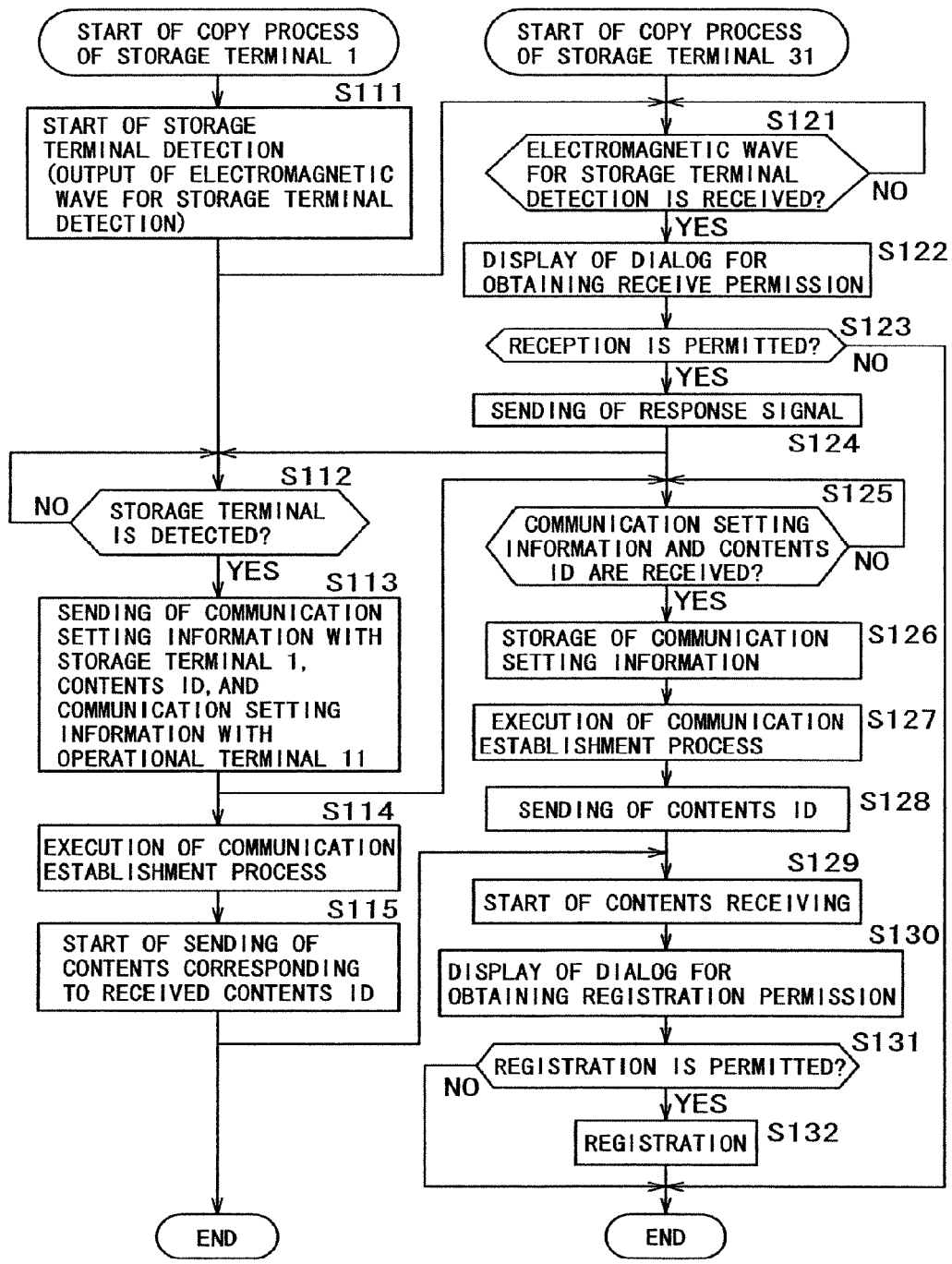
FIG. 13 is a flow chart illustrating details of the process of step S102 in FIG. 12.

Meanwhile in the process of receiving data (contents) as described above, such as the process of the operational terminal 11 in FIG. 9, the process of the operational terminal 21 in FIG. 10, and the process of the storage terminal 31 in FIG. 13, respective permissions to receive contents to be sent, to display the received contents, and to register the displayed contents are determined on the basis of the input to the dialog.

In other words, a user is required to provide input of his/her intention to give permission or intention not to give permission every time a dialog is displayed, and its operation is tedious.

Figure 14:
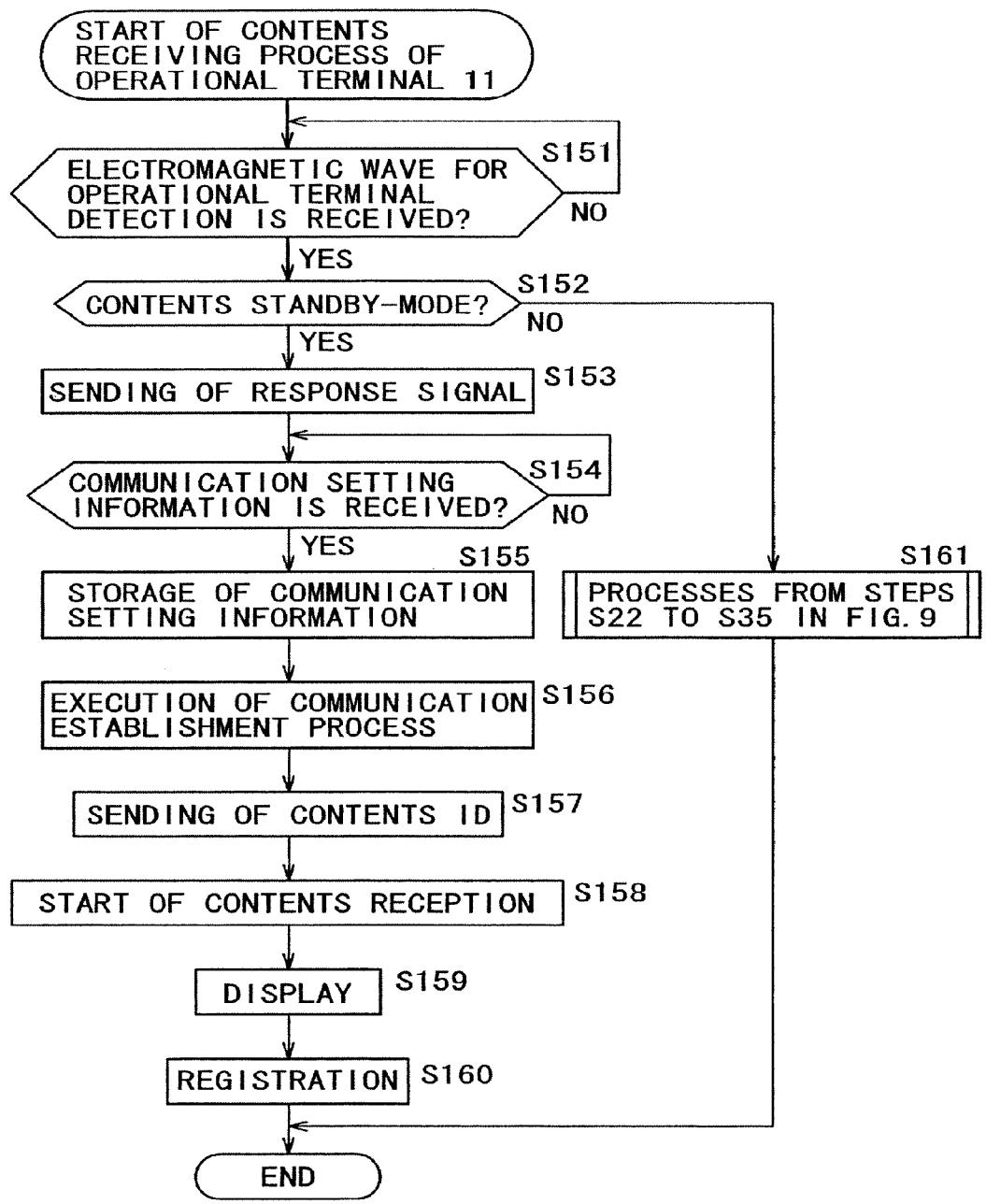
FIG. 14 is a flow chart illustrating other procedure of the process of an operational terminal 11 in FIG. 9.

The user's operation can be simplified by, for example, performing the process of the operational terminal 11 in FIG. 9, in a procedure shown in a flow chart of FIG. 14.

That is, in step S151, the CPU 101 of the operational terminal 11 waits until an electromagnetic wave for operational terminal detection is received by the IC tag reader/writer 12, and proceeds to step S152 when the electromagnetic wave is received.

In step S152, the CPU 101 of the operational terminal 11 determines whether the operational terminal 11 is in a content standby-mode or not. The content standby-mode of the operational terminal 11 is to be set by a predetermined operation to the operation unit 106, which is previously executed by the user 13. The CPU 101 is to make a determination in step S152, by determinating for example whether such setting is stored in the memory unit 109 or not.

When it is determined in step S152 that the operational terminal 11 is in the content standby-mode, the CPU 101 of the operational terminal 11 sends a response signal via the IC tag reader/writer 12 (the antenna resonant circuit).

Since in step S154 to step S157 there is performed the similar process as in the case of step S25 to step S28 in FIG. 9, description thereof is omitted.

In step S158, the CPU 101 of the operational terminal 11 initiates receiving of contents sent from the storage terminal 1, and in step S159, initiates a display process for displaying the received contents on the display 108. Then, in step S160, the CPU 101 initiates process for registering (storing) the displayed contents in the memory unit 109.

In other words, when the operational terminal 11 is in a content standby-mode, respective permissions to receive the contents, to display the contents, and to register the contents are not requested to a user. Therefore, the user can receive, display, and register the contents by a simple operation.

When it is determined in step S152 that the operational terminal 11 is not in the content standby-mode, there proceeds to step S161, and the similar process as in step S22 to step S35 in FIG. 9 are performed.

Figure 15:
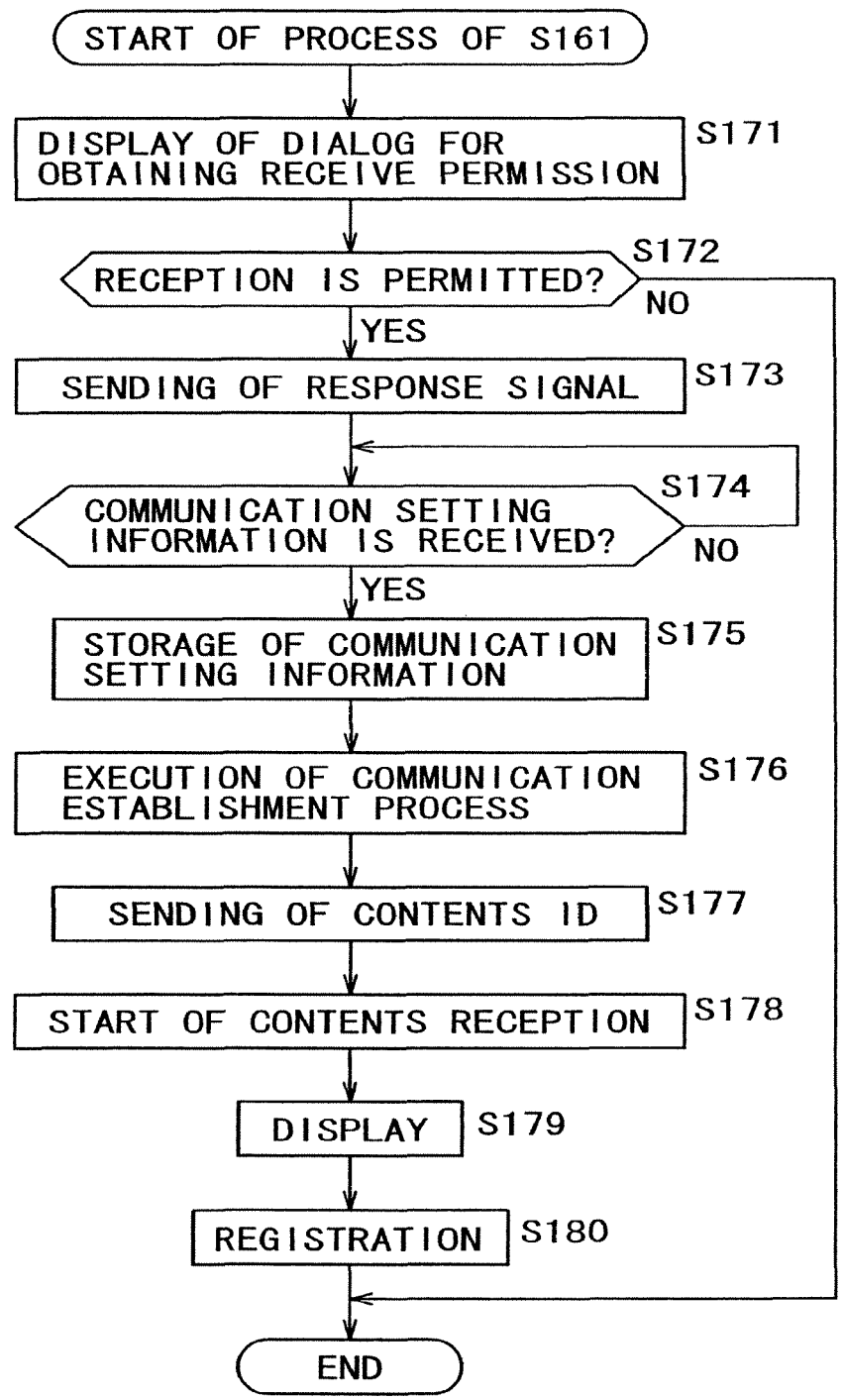
FIG. 15 is a flow chart illustrating other procedure of step S161 in FIG. 14.

Hereat, in place of the process in step S22 to step S35 in FIG. 9, which are executed in step S161, it is also possible to perform process as shown in FIG. 15.

That is, in this case, a dialog for obtaining permission to receive contents is displayed in step S171. However, when it is determined in step S172 that the reception of the contents is permitted, none of permission to display the contents and permission to register the contents are requested to a user, and the contents is displayed and registered in step S179 and step S180, respectively.

Although the operation on receiving side is described in FIG. 14 and FIG. 15, for example, the above-mentioned sequence of processes are also executable by hardware, and they can also be executed by software. In the case of having software execute the sequence of processes, it is installed from a program storage medium to a computer in which a program configuring the software is incorporated into a dedicated hardware, or a general-purpose personal computer or the like capable of executing a variety of functions by installing various programs.

This storage medium is configured not only by package media including magnetic disks 71, 131, 171 (including a floppy disk), optical disks 72, 132, 172 (including a CD-ROM (compact disc-read only memory), and a DVD (digital versatile disk)), magneto-optical disks 73, 133, 173 (including an MD (mini-disc)), or semiconductor memory 74, 134, 174, each of which is provided for providing a program to a user, apart from a computer, as shown in FIGS. 4, 6, and 7, but also by ROMs 52, 102, 152 in which a program is stored, and a hard disk contained in the memory units 59, 109, 159, each of which is provided to a user in a state of previously being incorporated into a computer.

In the present specification, the step of describing a program to be provided by a medium includes, of course, the process performed in time series in described sequence, as well as the process executed in parallel or individually, even if it is not necessarily executed in time series.

Additionally in the present specification, the term system implies the entire apparatus configured by a plurality of apparatuses.

INDUSTRIAL APPLICABILITY

According to a first aspect of the present invention, it is capable of providing contents in a variety of methods.

According to a second aspect of the present invention, it is capable of providing contents in a variety of methods.

According to a third aspect of the present invention, it is capable of easily process obtained contents.

The invention claimed is:

1. An information processing apparatus comprising:
a display device;
an input device;
a short range communication device;
a network communication device; and
circuitry configured to:
  execute a first receiving process to receive information identifying a first content from an another information processing apparatus via the short range communication device,
  execute a second receiving process to receive, via the network communication device and based on the information identifying the first content, the first content from a content provisioning apparatus storing the first content,
  execute a first utilization process to utilize the first content, and
  execute a permission validation process comprising:
    controlling the display device to present to a user a dialog for obtaining a permission for an operation;
    receiving, via the input device, a user intention of permitting or not permitting the operation; and
    determining, based on the user intention, whether the user provides the permission.

2. The information processing apparatus according to claim 1, wherein the short range communication device is configured to utilize Manchester code and ASK (Amplitude Shift Keying) modulation.

3. The information processing apparatus according to claim 1, wherein the short range communication device is configured to utilize Bluetooth communication.

4. The information processing apparatus according to claim 1, wherein the network communication device is configured to utilize wireless LAN communication.

5. The information processing apparatus according to claim 1, wherein the first content is selected from at least one of a content including a moving image, a content including a static image and a content including address information.

6. The information processing apparatus according to claim 1, wherein the information identifying the first content includes information for controlling utilization of the first content or information indicating an apparatus that controls utilization of the first content.

7. The information processing apparatus according to claim 1, wherein the permission validation process comprises receiving the user intention, input to the displayed dialog, to permit a reception of the first content, or the user intention, input to the displayed dialog, not to permit a reception of the first content.

8. A non-transitory computer-readable medium having embodied thereon a program, which when executed by an information processing apparatus causes the information processing apparatus to execute a method, the method comprising:
 executing a first receiving process to receive information identifying a first content from an another information processing apparatus via a short range communication device,
 executing a second receiving process to receive, via a network communication device and based on the information identifying the first content, the first content from a content provisioning apparatus storing the first content,
 executing a first utilization process to utilize the first content, and
 executing a permission validation process comprising:
  controlling a display device to present to a user a dialog for obtaining a permission for an operation;
  receiving, via an input device, a user intention of permitting or not permitting the operation; and
  determining, based on the user intention, whether the user provides the permission.

9. The non-transitory computer-readable medium according to claim 8, wherein the short range communication device is configured to utilize Manchester code and ASK (Amplitude Shift Keying) modulation.

10. The non-transitory computer-readable medium according to claim 8, wherein the short range communication device is configured to utilize Bluetooth communication.

11. The non-transitory computer-readable medium according to claim 8, wherein the network communication device is configured to utilize wireless LAN communication.

12. The non-transitory computer-readable medium according to claim 8, wherein the first content is selected from at least one of a content including a moving image, a content including a static image and a content including address information.

13. The non-transitory computer-readable medium according to claim 8, wherein the information identifying the first content includes information for controlling utilization of the first content or information indicating an apparatus that controls utilization of the first content.

14. The non-transitory computer-readable medium according to claim 8, wherein the permission validation process comprises receiving the user intention, input to the displayed dialog, to permit a reception of the first content, or the user intention, input to the displayed dialog, not to permit a reception of the first content.

15. An information processing method comprising:
 executing a first receiving process to receive information identifying a first content from an another information processing apparatus via a short range communication device,
 executing a second receiving process to receive, via a network communication device and based on the information identifying the first content, the first content from a content provisioning apparatus storing the first content,
 executing a first utilization process to utilize the first content, and
 executing a permission validation process comprising:
  controlling a display device to present to a user a dialog for obtaining a permission for an operation;
  receiving, via an input device, a user intention of permitting or not permitting the operation; and
  determining, based on the user intention, whether the user provides the permission.

* * * * *